US 8,767,080 B2

(12) United States Patent
Mowry

(10) Patent No.: US 8,767,080 B2
(45) Date of Patent: Jul. 1, 2014

(54) SYSTEM AND APPARATUS FOR INCREASING QUALITY AND EFFICIENCY OF FILM CAPTURE AND METHODS OF USE THEREOF

(75) Inventor: Craig Mowry, Southhampton, NY (US)

(73) Assignee: Cedar Crest Partners Inc., Southampton, NY (US)

( * ) Notice: Subject to any disclaimer, the term of this patent is extended or adjusted under 35 U.S.C. 154(b) by 704 days.

(21) Appl. No.: 12/362,074

(22) Filed: Jan. 29, 2009

(65) Prior Publication Data
US 2009/0195664 A1 Aug. 6, 2009

Related U.S. Application Data

(63) Continuation of application No. 11/611,793, filed on Dec. 15, 2006, which is a continuation-in-part of application No. 11/510,091, filed on Aug. 25, 2006.

(60) Provisional application No. 60/750,912, filed on Dec. 15, 2005, provisional application No. 60/739,881, filed on Nov. 25, 2005, provisional application No. 60/739,142, filed on Nov. 22, 2005, provisional application No. 60/732,347, filed on Oct. 31, 2005, provisional application No. 60/727,538, filed on Oct. 16, 2005, provisional application No. 60/712,189, filed on Aug. 29, 2005, provisional application No. 60/711,345, filed on Aug. 25, 2005, provisional application No. 60/710,868, filed on Aug. 25, 2005.

(51) Int. Cl.
| H04N 5/225 | (2006.01) |
|---|---|
| H04N 5/228 | (2006.01) |
| H04N 9/73 | (2006.01) |
| H04N 5/235 | (2006.01) |
| H04N 9/68 | (2006.01) |
| G06K 9/40 | (2006.01) |
| G06K 9/32 | (2006.01) |

(52) U.S. Cl.
USPC ..... 348/208.4; 348/154; 348/184; 348/207.1; 348/207.99; 348/208.13; 348/223.1; 348/229.1; 348/231.6; 348/254; 348/294; 348/296; 348/297; 348/345; 348/362; 348/375; 382/254; 382/260; 382/274; 382/283; 382/284; 382/294; 382/299

(58) Field of Classification Search
None
See application file for complete search history.

(56) References Cited

U.S. PATENT DOCUMENTS

| 1,912,582 A | 6/1933 | Kelley |
|---|---|---|
| 4,146,321 A | 3/1979 | Melillo |

(Continued)

FOREIGN PATENT DOCUMENTS

| EP | 1 014 112 | 6/2000 |
|---|---|---|
| GB | 01073 | 1/1916 |

(Continued)

OTHER PUBLICATIONS

Korean Office Action dated Feb. 24, 2011 for Korean Patent Application No. 2008-7000087, 3 pages.

(Continued)

*Primary Examiner* — Ario Etienne
*Assistant Examiner* — Ho Shiu
(74) *Attorney, Agent, or Firm* — Leason Ellis LLP

(57) ABSTRACT

A system, apparatus, or method is provided for imaging and for capturing visuals to provide image manipulation options for increasing resolution of subject images. A system, apparatus or method for increasing resolution of subject images using a camera to deliver unexposed photographic emulsion or a digital image and to generate images of greater resolution by modifying digital images or modifying digital and emulsion images.

40 Claims, 21 Drawing Sheets

(56) References Cited

U.S. PATENT DOCUMENTS

| | | | |
|---|---|---|---|
| 4,561,745 A | 12/1985 | Kinsman et al. | |
| 4,689,696 A | 8/1987 | Plummer | |
| 4,710,806 A | 12/1987 | Iwai et al. | |
| 4,727,425 A | 2/1988 | Mayne et al. | |
| 5,140,414 A | 8/1992 | Mowry | |
| 5,174,641 A * | 12/1992 | Lim | 348/438.1 |
| 5,249,056 A * | 9/1993 | Gunday et al. | 348/97 |
| 5,278,659 A * | 1/1994 | Araki | 348/230.1 |
| 5,374,954 A | 12/1994 | Mowry | |
| 5,406,326 A | 4/1995 | Mowry | |
| 5,455,689 A | 10/1995 | Taylor et al. | |
| 5,457,491 A | 10/1995 | Mowry | |
| 5,493,353 A * | 2/1996 | Chen | 396/429 |
| 5,625,410 A * | 4/1997 | Washino et al. | 348/154 |
| 5,627,614 A * | 5/1997 | Weisgerber | 352/46 |
| 5,661,845 A * | 8/1997 | Sugiyama | 386/343 |
| 5,687,011 A | 11/1997 | Mowry | |
| 5,696,848 A * | 12/1997 | Patti et al. | 382/254 |
| 5,790,086 A | 8/1998 | Zelitt | |
| 5,815,748 A | 9/1998 | Hamamura et al. | |
| 5,883,666 A * | 3/1999 | Kyuma et al. | 348/229.1 |
| 5,889,553 A | 3/1999 | Kino et al. | |
| 5,892,543 A | 4/1999 | Zheng et al. | |
| 5,926,575 A | 7/1999 | Ohzeki et al. | |
| 5,940,641 A | 8/1999 | McIntyre et al. | |
| 6,014,165 A | 1/2000 | McIntyre et al. | |
| 6,020,931 A * | 2/2000 | Bilbrey et al. | 348/584 |
| 6,061,471 A * | 5/2000 | Coleman, Jr. | 382/173 |
| 6,067,112 A | 5/2000 | Wellner et al. | |
| 6,143,459 A | 11/2000 | Vizard | |
| 6,177,958 B1 * | 1/2001 | Anderson | 348/362 |
| 6,215,516 B1 | 4/2001 | Ma et al. | |
| 6,219,097 B1 * | 4/2001 | Kamishima et al. | 348/297 |
| 6,226,033 B1 * | 5/2001 | Glasgow | 348/97 |
| 6,233,282 B1 * | 5/2001 | Guerrera | 375/240.25 |
| 6,323,858 B1 | 11/2001 | Gilbert et al. | |
| 6,392,691 B1 * | 5/2002 | Swinson et al. | 348/96 |
| 6,396,627 B1 | 5/2002 | Tachihara et al. | |
| 6,404,516 B1 * | 6/2002 | Edgar | 358/487 |
| 6,414,791 B1 | 7/2002 | Sugawara et al. | |
| 6,442,203 B1 * | 8/2002 | Demos | 375/240.16 |
| 6,463,220 B1 | 10/2002 | Dance et al. | |
| 6,505,003 B1 | 1/2003 | Desormeaux | |
| 6,526,098 B1 * | 2/2003 | Kato et al. | 375/240.24 |
| 6,553,187 B2 | 4/2003 | Jones | |
| 6,584,281 B2 | 6/2003 | Kamata et al. | |
| 6,587,596 B1 * | 7/2003 | Haeberli | 382/283 |
| 6,587,597 B1 | 7/2003 | Nakao et al. | |
| 6,593,958 B2 | 7/2003 | Kremen | |
| 6,594,041 B1 * | 7/2003 | Canata | 358/506 |
| 6,597,468 B1 * | 7/2003 | Inuiya | 358/1.15 |
| 6,639,625 B1 | 10/2003 | Ishida et al. | |
| 6,658,056 B1 * | 12/2003 | Duruoz et al. | 375/240 |
| 6,665,493 B2 | 12/2003 | Miyazaki et al. | |
| 6,813,391 B1 * | 11/2004 | Uyttendaele et al. | 382/284 |
| 6,833,864 B1 * | 12/2004 | Ashida | 348/229.1 |
| 6,862,140 B2 | 3/2005 | Ogino | |
| 6,871,003 B1 * | 3/2005 | Phillips et al. | 386/281 |
| 6,913,826 B2 | 7/2005 | Lee et al. | |
| 6,929,905 B2 | 8/2005 | Gordon et al. | |
| 6,933,962 B2 | 8/2005 | Yamamoto | |
| 6,999,110 B2 | 2/2006 | Kobayashi | |
| 7,016,869 B1 * | 3/2006 | Haeberli | 705/27.2 |
| 7,061,532 B2 | 6/2006 | Silverstein | |
| 7,098,946 B1 * | 8/2006 | Koseki et al. | 348/229.1 |
| 7,102,686 B1 * | 9/2006 | Orimoto et al. | 348/375 |
| 7,110,025 B1 * | 9/2006 | Loui et al. | 348/220.1 |
| 7,123,287 B2 | 10/2006 | Surman | |
| 7,148,916 B2 | 12/2006 | Fujiwara | |
| 7,167,191 B2 | 1/2007 | Hull et al. | |
| 7,190,389 B1 | 3/2007 | Abe et al. | |
| 7,260,323 B2 | 8/2007 | Szajewski et al. | |
| 7,301,563 B1 * | 11/2007 | Kakinuma et al. | 348/208.13 |
| 7,389,002 B1 | 6/2008 | Knight | |
| 7,406,254 B2 | 7/2008 | Yamagishi | |
| 7,417,682 B2 | 8/2008 | Kuwakino et al. | |
| 7,443,447 B2 | 10/2008 | Shirakawa | |
| 7,619,656 B2 * | 11/2009 | Ben-Ezra et al. | 348/208.4 |
| 7,626,614 B1 * | 12/2009 | Marcu | 348/222.1 |
| 8,135,261 B1 * | 3/2012 | Black | 386/284 |
| 8,553,093 B2 * | 10/2013 | Wong et al. | 348/208.13 |
| 8,577,184 B2 * | 11/2013 | Young | 382/299 |
| 2001/0012058 A1 * | 8/2001 | Glasgow | 348/97 |
| 2001/0030694 A1 * | 10/2001 | Abe | 348/223 |
| 2001/0033295 A1 * | 10/2001 | Phillips | 345/723 |
| 2002/0057907 A1 | 5/2002 | Kamata | |
| 2002/0084172 A1 | 7/2002 | Toms | |
| 2002/0118293 A1 | 8/2002 | Hori et al. | |
| 2002/0126985 A1 * | 9/2002 | Galt et al. | 386/52 |
| 2002/0141005 A1 * | 10/2002 | Okisu et al. | 358/540 |
| 2003/0065550 A1 * | 4/2003 | Haeberli | 705/27 |
| 2003/0103670 A1 * | 6/2003 | Schoelkopf et al. | 382/162 |
| 2003/0133019 A1 * | 7/2003 | Higurashi et al. | 348/218.1 |
| 2003/0146986 A1 * | 8/2003 | Calderwood | 348/240.1 |
| 2003/0151679 A1 * | 8/2003 | Amerson et al. | 348/231.6 |
| 2003/0193690 A1 * | 10/2003 | Inuiya | 358/1.15 |
| 2003/0194148 A1 * | 10/2003 | Haeberli | 382/283 |
| 2003/0202106 A1 | 10/2003 | Kandleinsberger | |
| 2003/0231255 A1 | 12/2003 | Szajewski et al. | |
| 2004/0004666 A1 * | 1/2004 | Sano | 348/254 |
| 2004/0051790 A1 * | 3/2004 | Tamaru et al. | 348/223.1 |
| 2004/0061794 A1 * | 4/2004 | Bodin | 348/231.99 |
| 2004/0070778 A1 * | 4/2004 | Matama | 358/1.9 |
| 2004/0081437 A1 * | 4/2004 | Asada et al. | 386/131 |
| 2004/0101043 A1 | 5/2004 | Flack et al. | |
| 2004/0119831 A1 | 6/2004 | Miyawaki | |
| 2004/0130649 A1 * | 7/2004 | Lee | 348/345 |
| 2004/0165091 A1 * | 8/2004 | Takemura et al. | 348/296 |
| 2004/0218830 A1 * | 11/2004 | Kang et al. | 382/274 |
| 2004/0223058 A1 * | 11/2004 | Richter et al. | 348/207.1 |
| 2005/0036044 A1 * | 2/2005 | Funakura | 348/239 |
| 2005/0047676 A1 * | 3/2005 | Kang et al. | 382/274 |
| 2005/0052543 A1 * | 3/2005 | Li et al. | 348/222.1 |
| 2005/0057475 A1 * | 3/2005 | Mamba et al. | 345/92 |
| 2005/0057662 A1 * | 3/2005 | Washisu | 348/208.99 |
| 2005/0057687 A1 | 3/2005 | Irani et al. | |
| 2005/0057691 A1 * | 3/2005 | Dean et al. | 348/552 |
| 2005/0083409 A1 * | 4/2005 | Li et al. | 348/207.99 |
| 2005/0099504 A1 * | 5/2005 | Nayar et al. | 348/222.1 |
| 2005/0105001 A1 * | 5/2005 | Yui et al. | 348/441 |
| 2005/0151838 A1 | 7/2005 | Fujita et al. | |
| 2005/0158025 A1 | 7/2005 | Shinkai | 386/68 |
| 2005/0168623 A1 * | 8/2005 | Stavely et al. | 348/362 |
| 2005/0219642 A1 * | 10/2005 | Yachida et al. | 358/448 |
| 2005/0243176 A1 * | 11/2005 | Wu et al. | 348/207.1 |
| 2005/0243177 A1 * | 11/2005 | Kang et al. | 348/207.1 |
| 2005/0247858 A1 * | 11/2005 | Misawa | 250/208.1 |
| 2005/0254722 A1 * | 11/2005 | Fattal et al. | 382/274 |
| 2005/0259888 A1 * | 11/2005 | Ozluturk | 382/260 |
| 2005/0265688 A1 * | 12/2005 | Kobayashi | 386/46 |
| 2005/0270387 A1 | 12/2005 | Watanabe et al. | |
| 2005/0275747 A1 * | 12/2005 | Nayar et al. | 348/362 |
| 2006/0007346 A1 * | 1/2006 | Nakamura et al. | 348/362 |
| 2006/0033823 A1 * | 2/2006 | Okamura | 348/254 |
| 2006/0050788 A1 | 3/2006 | Techmer | |
| 2006/0072073 A1 * | 4/2006 | Weisgerber | 352/86 |
| 2006/0072399 A1 * | 4/2006 | Fujimoto et al. | 369/47.1 |
| 2006/0103736 A1 * | 5/2006 | Obrador | 348/222.1 |
| 2006/0115174 A1 * | 6/2006 | Lim et al. | 382/260 |
| 2006/0119710 A1 | 6/2006 | Ben-Ezra et al. | |
| 2006/0138234 A1 * | 6/2006 | Joseph et al. | 235/454 |
| 2006/0139470 A1 * | 6/2006 | McGowan | 348/294 |
| 2006/0177150 A1 * | 8/2006 | Uyttendaele et al. | 382/284 |
| 2006/0203335 A1 * | 9/2006 | Martin et al. | 359/462 |
| 2006/0226231 A1 * | 10/2006 | Johnston et al. | 235/462.45 |
| 2006/0274188 A1 | 12/2006 | Mowry | |
| 2007/0002169 A1 * | 1/2007 | Munsil et al. | 348/446 |
| 2007/0030342 A1 * | 2/2007 | Wilburn et al. | 348/47 |
| 2007/0036467 A1 * | 2/2007 | Coleman et al. | 382/294 |
| 2007/0122029 A1 | 5/2007 | Mowry | |
| 2007/0160360 A1 | 7/2007 | Mowry | |
| 2011/0164263 A1 | 7/2011 | Samain et al. | |
| 2011/0211077 A1 * | 9/2011 | Nayar et al. | 348/207.1 |

(56) References Cited

U.S. PATENT DOCUMENTS

FOREIGN PATENT DOCUMENTS

| | | |
|---|---|---|
| GB | 921 706 | 3/1963 |
| GB | 2 072 866 | 10/1981 |
| GB | 2 317 020 | 3/1998 |
| JP | 05-241099 | 9/1993 |
| JP | 07-143439 | 6/1995 |
| JP | 07-203318 | 8/1995 |
| JP | 10-254056 A | 9/1998 |
| JP | 20050318548 | 11/2005 |
| WO | WO 2007/014329 | 2/2007 |

OTHER PUBLICATIONS

PCT International Preliminary Report on Patentability issued Jan. 29, 2008, in corresponding International Application No. PCT/US2006/029407.
PCT International Search Report issued Feb. 7, 2007, in corresponding International Application No. PCT/US2006/029407.
Japanese OA, due Feb. 15, 2011, for Japanese Patent Application No. 2008-514964, 3 pages (with English translation).
"QuickTime VR Authoring Studio," *Apple Computer Inc., U.S.A.*, http://web.archive.org/web/20050329120354/http://manuals.info.apple.com/en/QuickTimeVR_AuthoringStudioUSerManual.pdf, Mar. 29, 2006, p. 25 and 82.
International Search Report dated Jan. 29, 2008, 10 pages.
EP Search Report for EP Application No. 06840290.8, dated Apr. 10, 2012, 9 pages.
EP Search Report for EP Application No. 06760697.0, dated Apr. 11, 2012, 11 pages.
EP Search Report for EP Application No. 06802320.9, dated Apr. 17, 2012, 9 pages.
European Office Action dated Nov. 5, 2012 for EP Application Serial No. 06840290.8, 5 pages.
Notice of Allowance dated Jul. 5, 2012 for U.S. Appl. No. 11/611,793, 33 pages.
OA dated Oct. 21, 2011 for U.S. Appl. No. 11/611,793, 40 pages.

\* cited by examiner

 — 402
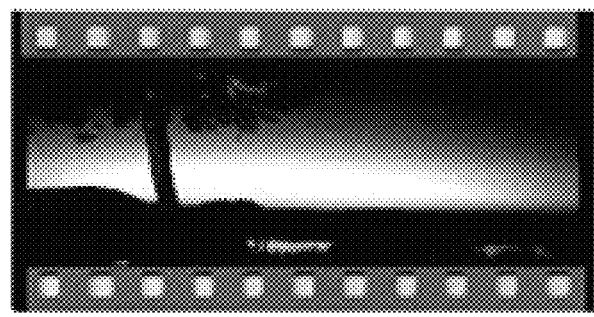 — 404
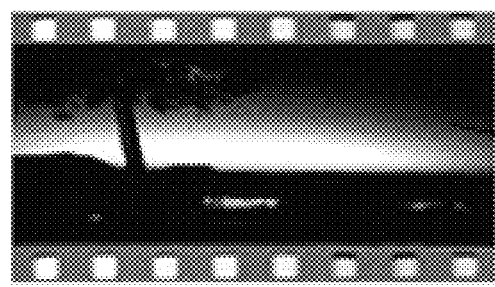 — 406
FIG. 4

Drawing 4:
6 FRAMES (on opposite sides of same film stock) representing 12 final digital frames of material, or ½ second of recording at 24 fps (1.66 screen ratio)

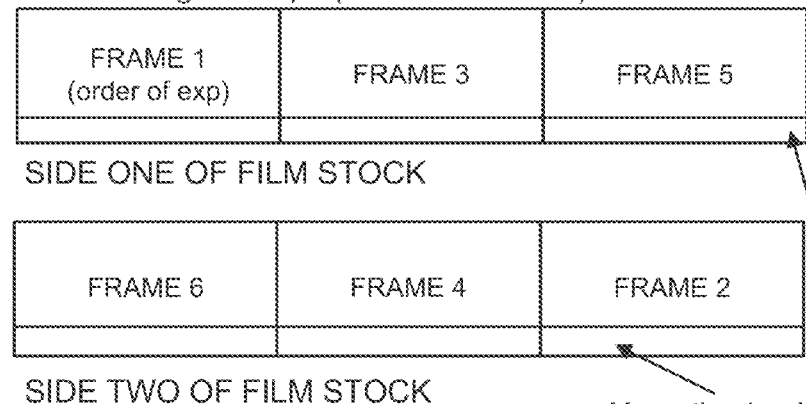

SIDE ONE OF FILM STOCK

SIDE TWO OF FILM STOCK

| FRAME 1 |
|---|
| FRAME 1i |
| 2 |
| 2i |
| 3 |
| 3i |
| 4 |
| 4i |
| 5 |
| 5i |
| 6 |
| 6i |

12 Final 1.65 to 1 HIGH DEF digital visuals derived from the 6 filmed frames, and selectively aided by HIGH DEFINITION DIGITALLY ORIGINATED MATERIAL captured through the same lens, at or around the same time, (or a similarly positioned lens.)

Note visuals with 'I' are morphed or "inferred" visuals that SHOULD HAVE occurred had the film stock have been exposed at a higher frame rate.

The rate of film exposure may selectively be 24 fps (or higher) to provide filmed visuals for substantially every digital visual resulting, OR fewer than 24 fps, even as few as one per second, may actually be exposed as "key reference frames" with inferred frames selectively provided by digital manipulation means with or without reference to digital material captured through the same camera lens as used to expose the film.

Magnetic, visual or other selected embedded datacode referencing for post production reference, including selective reference to corresponding digitally originated visuals captured through the same or strategically positioned lens.

"I" visuals' data selectively affected (or not) by high definition visuals captured simultaneously, or in and around the time of the film visuals' capture. And/or, "I" visuals are created solely from data occurring within filmed visuals and/or digitized versions of the filmed visuals captured.

FIG. 8

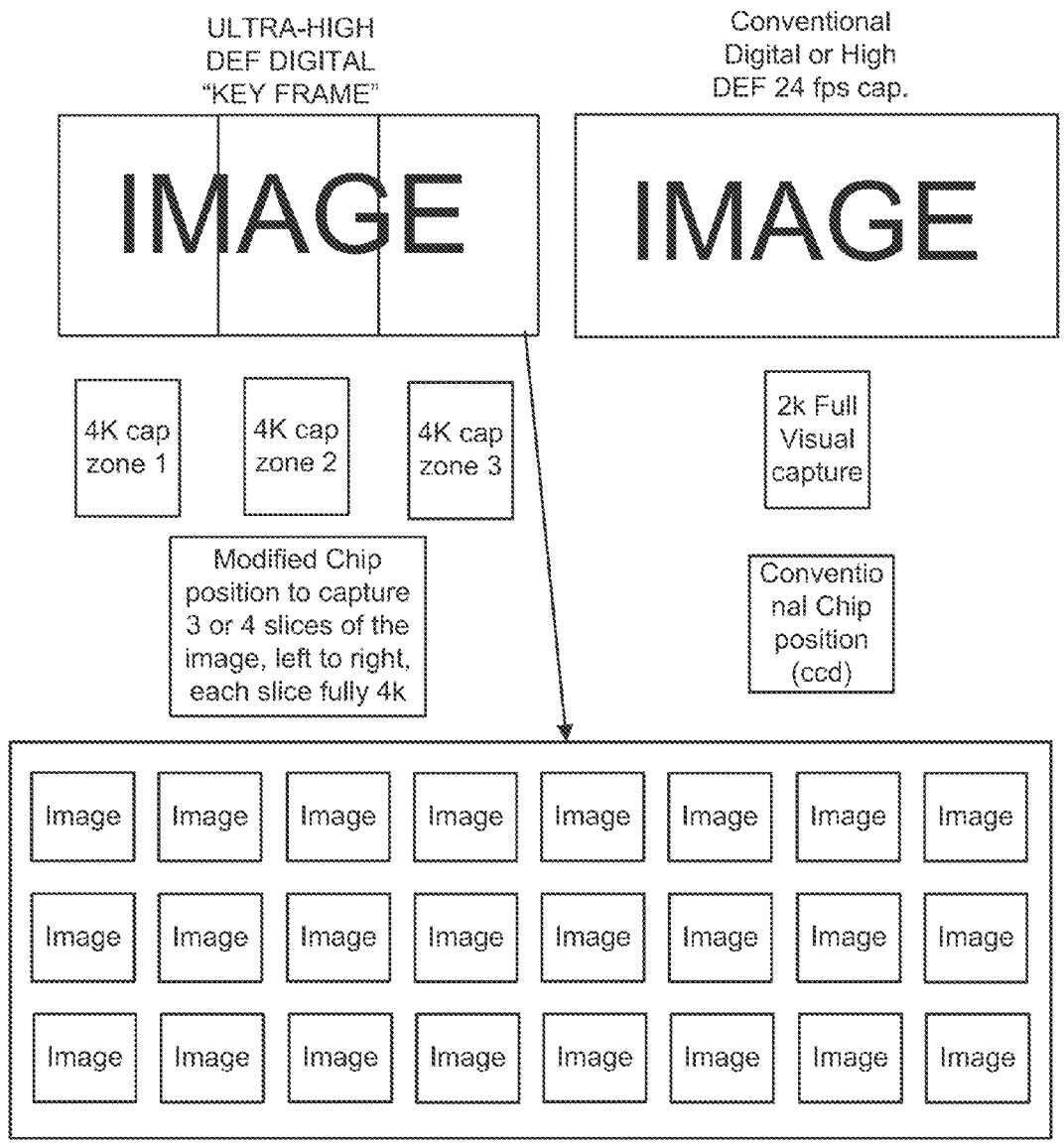

24 Digital visuals captured through lens over 1 second of time. Each 2k visual is modified/upgraded to 12k, applying KEY FRAME resolution to each sequential visual, altering KEY FRAME position date based on shifting visual aspects within the 24 frames.

As the conventional 24 fps captures provide the "wire frame" image aspect position data, the richer KEY FRAME data, by image zone, can replace image data in EVERY ONE of the 24 images, with exactness, resulting in 24 images each with up to 12k data, indistinguishable from images of the same scene from a camera with 12k image capture capacity (not yet existing)

FIG. 16

SYSTEM AND APPARATUS FOR INCREASING QUALITY AND EFFICIENCY OF FILM CAPTURE AND METHODS OF USE THEREOF

CROSS-REFERENCE TO RELATED APPLICATIONS

The present application is a continuation application of U.S. patent application Ser. No. 11/611,793, filed on Dec. 15, 2006, which is a continuation-in-part of U.S. patent application Ser. No. 11/510,091 filed on Aug. 25, 2006; which claims the benefit under 35 U.S.C. §119(e) of U.S. Provisional Application Ser. No. 60/750,912, filed on Dec. 15, 2005, 60/739,881, filed Nov. 25, 2005; 60/739,142, filed Nov. 22, 2005; 60/732,347, filed Oct. 31, 2005; 60/727,538, filed Oct. 16, 2005; 60/712,189, filed Aug. 29, 2005; 60/711,345, filed Aug. 25, 2005; and 60/710,868 the entire contents of which are hereby incorporated by reference.

This application is further related to and further incorporates by reference in their entirety, U.S. patent application Ser. No. 11/562,840 filed on Nov. 22, 2006; Ser. No. 11/549,937, filed on Oct. 16, 2006; Ser. No. 11/495,933, filed Jul. 27, 2006; Ser. No. 11/492,397, filed Jul. 24, 2006; Ser. No. 11/481,526, filed Jul. 6, 2006; Ser. No. 11/473,570, filed Jun. 22, 2006; Ser. No. 11/472,728, filed Jun. 21, 2006; Ser. No. 11/447,406, filed on Jun. 5, 2006; and Ser. No. 11/408,389, filed on Apr. 20, 2006; and U.S. Provisional Application Ser. Nos. 60/702,910, filed on Jul. 27, 2005; 60/701,424, filed on Jul. 22, 2005; 60/696,829, filed Jul. 6, 2005; 60/693,011, filed Jun. 22, 2005; 60/692,502, filed Jun. 21, 2005; 60/692,501, filed Jun. 21, 2005; 60/688,454, filed Jun. 9, 2005; 60/686,883, filed Jun. 3, 2005; and 60/672,905, filed Apr. 20, 2005, the entire contents of which are as if set forth herein in their entirety.

FIELD

The present invention relates to imaging and, more particularly, to capturing visuals to provide image manipulation options for increasing resolution of subject images. The present invention further relates to a system, apparatus or method for increasing resolution of subject images using a camera to deliver unexposed photographic emulsion or a digital image and to generate images of greater resolution by modifying digital images or modifying digital and emulsion images.

BACKGROUND

Problems exist in the art of cinematography which include the influx of digital origination systems and options for cinema and television, cutting into the film origination market. Film is the preferred artistic medium of many cinematographers, though the drawbacks including the expense of film and processing, the cumbersome and heavy aspects of the equipment, and the inability to see as definitely what is being captured as digital and video options provide, make film an increasingly difficult choice in today's imaging environment. Digital manufactures strive, and claim, to provide image recording means that rivals or surpasses the present potential of 35 mm filmed images. A need exists in the art for improved systems and methods for maintaining the quality of filmed images while employing the flexibility of digital origination systems to modify and enhance the filmed images.

SUMMARY

The present invention relates to a system, apparatus, or method for selectively increasing both quality and quantity of film images captured without significantly altering the capture equipment configuration(s) and without significantly altering the capture media, e.g., film stock. In one configuration, the present invention at least doubles the "amount" of emulsion available for recording or capturing visuals without increasing weight necessarily, as all remains on the same "amount" of celluloid or related emulsion supporting material. The present invention further provides a system, apparatus, or method for selectively increasing both quality and quantity of film images captured without significantly altering the capture equipment configuration(s) and without significantly altering the capture media, e.g., film stock The present invention provides a system, apparatus, or method that at least doubles the "amount" of emulsion available for recording or capturing visuals without increasing weight necessarily, as all remains on the same "amount" of celluloid or related emulsion supporting material.

A system for concurrently capturing and storing two distinct information records of a single visual scene to generate one or more final images is provided which comprises a camera comprising an image capture assembly for capturing and recording aspects of said visual scene within a photographic emulsion as high resolution image captures, an electronic imaging module within said camera for capturing and recording aspects relating to said visual scene operating concurrently with said image capture assembly, said capturing and recording by said electronic imaging module and said image capture assembly occurring sequentially or simultaneously, said module at least capturing aspects related to said visual scene that are not recorded within said emulsion by said assembly, an image data management component comprising a computer readable medium to generate final images from image data derived from visual information recorded within said emulsion, said final images including modified versions of said visual information from said emulsion, said modified versions modified in part in accordance with information captured by said electronic imaging module, wherein one or more of said final images simulate high resolution image captures by said image capture assembly that said assembly did not in fact capture.

A method for transforming image data on a computer readable medium operable by a computer is provided which comprises identifying corresponding image zones from image data provided by a first electronic imaging module and a second electronic imaging module, modifying said image data captured by said first module to provide final images, said first module providing more data per image at capture than said second module, and repositioning selected image information related to said image zones from said image data provided by said first module, based on image information provided by said second module, said second module providing a plurality of image captures for each image capture by said first module.

A system for generating final images of greater resolution from originally captured images is provided which comprises a camera operable to deliver unexposed photographic emulsion to at least one image capture zone within the camera for exposure to light related to a subject visual, said zone being of a selected size and dimension, said emulsion being exposed within at least said image capture zone to said light, an electronic imaging module operable to record aspects of said subject visual, and an image data management component comprising a computer readable medium to apply information related to said emulsion exposed to said subject visual and information related to aspects of said subject visual captured by said electronic imaging module to create one or more final images.

A system for increasing resolution of subject images is provided which comprises a camera operable to deliver unexposed photographic emulsion to at least one image capture zone within the camera to record visuals on said emulsion, said zone being of a variable size and dimension, and an electronic imaging module in said camera operable to record aspects of said visuals recorded by said camera on said emulsion. The system can further comprise an image data modification program for generating final images from information in visuals recorded by said emulsion and from information recorded in aspects of visuals by said electronic imaging module. An apparatus is provided for increasing resolution of subject images. The camera can deliver unexposed photographic emulsion intermittently or continuously to at least one image capture zone within the camera.

A method for increasing resolution of subject images is provided which comprises delivering unexposed photographic emulsion to at least one image capture zone within a camera to record visuals on said emulsion, said zone being of a variable size and dimension, and recording aspects of said visuals by an electronic imaging module in said camera. The method can further comprise generating final images with an image data modification program from information in visuals recorded by said emulsion and from information recorded in aspects of visuals by said electronic imaging module. The camera can deliver unexposed photographic emulsion intermittently or continuously to at least one image capture zone within the camera.

A system for increasing resolution of subject images is provided which comprises a camera operable to deliver unexposed photographic emulsion to at least one image capture zone within a camera, said zone being of a selectable size and dimension, said image capture zone receiving said emulsion from the top or bottom of said zone with the emulsion exiting through the top or bottom of said zone following exposure, or receiving said emulsion from any side of said zone to exit said zone from the other side, following exposure of said emulsion, and an image data modification program for generating final images from information recorded within said emulsion, said program being operable to infer a selected number of images, of selectable equivalent total image information, between available images recorded within said emulsion. The camera can deliver unexposed photographic emulsion intermittently or continuously to at least one image capture zone within the camera.

A method for increasing resolution of subject images is provided which comprises delivering unexposed photographic emulsion to at least one image capture zone within a camera to record visuals, said zone being of a selectable size and dimension, receiving said emulsion into said image capture zone from the top or bottom of said zone with the emulsion exiting through the top or bottom of said zone following exposure, or receiving said emulsion from any side of said zone to exit said zone from the other side, following exposure of said emulsion, and generating final images from information recorded within said emulsion using an image data modification program, said program being operable to infer a selected number of images, of selectable equivalent total image information, between available images recorded within said emulsion. The camera can deliver unexposed photographic emulsion intermittently or continuously to at least one exposure zone or image capture zone within the camera.

Other features and advantages of the present invention will become apparent from the following description of the invention that refers to the accompanying drawings.

BRIEF DESCRIPTION OF THE DRAWINGS

For the purpose of illustrating the invention, it being understood, that the invention is not limited to the precise arrangements and instrumentalities shown. The features and advantages of the present invention will become apparent from the following description of the invention that refers to the accompanying drawings, in which:

FIG. 4 shows the advantage of an embodiment of the system with regards to final image quality and efficiency.

FIG. 8 shows data code referencing on film stock for post production reference.

FIG. 16 shows an embodiment of a hybrid imaging system configuration of the present invention.

DETAILED DESCRIPTION

Figure 1:
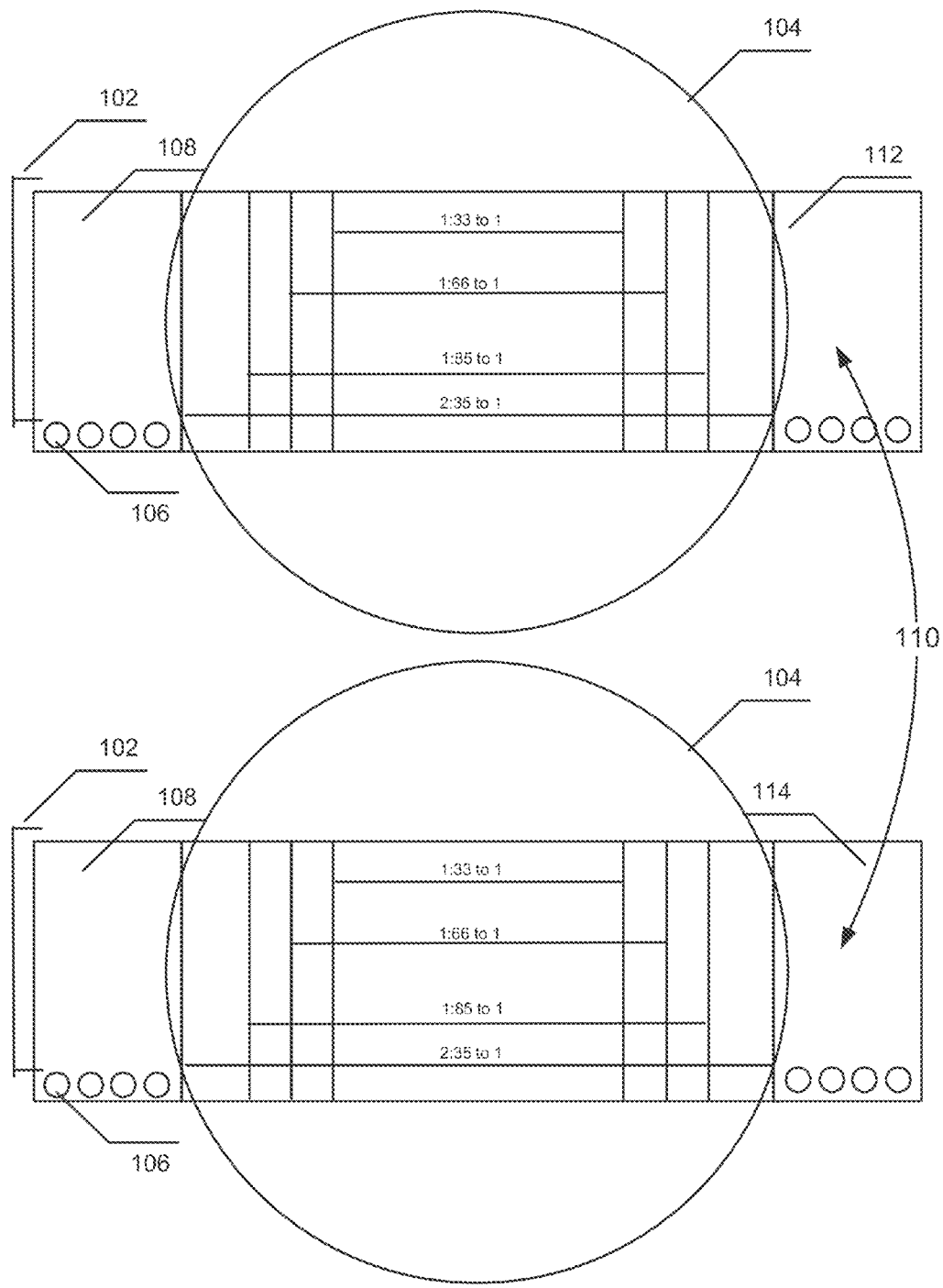
FIG. 1 shows 16 mm film stock and 35 mm film stock as it is delivered to a horizontally configured camera film gate mechanism by transport component (such as roller) exiting the gate as exposed film stock.

The present invention relates to a system, apparatus, or method for selectively increasing both quality and quantity of film images captured without significantly altering the capture equipment configuration(s) and without significantly altering the capture media, e.g., film stock. The present invention further relates to the simulation of high resolution image captures that did not occur from single high resolution "key frames," which can be derived from actual image captures within emulsion or other capture media such as digital image captures. Herein, these "key frame" pictures are subsequently informed, as employed by an image data managing computer, by a second data record to modify the key frame image aspects to reposition such aspects as they "would have" occurred had the high resolution image capture system in fact captured the simulated image; for example, had the high resolution image capture system been operating at a high capture frame rate and thus generating more original captures per second. In one configuration, the present invention at least doubles the "amount" of emulsion available for recording or capturing visuals without increasing weight necessarily, as all remains on the same "amount" of celluloid or related emulsion supporting material. A system for concurrently capturing and storing two distinct information records of a single visual scene to generate one or more final images is provided which comprises a camera comprising an image capture assembly for capturing and recording aspects of said visual scene within a photographic emulsion as high resolution image captures, an electronic imaging module within said camera for capturing and recording aspects relating to said visual scene operating concurrently with said image capture assembly, said capturing and recording by said electronic imaging module and said image capture assembly occurring sequentially or simultaneously, said module at least capturing aspects related to said visual scene that are not recorded within said emulsion by said assembly, an image data management component comprising a computer readable medium to generate final images from image data derived from visual information recorded within said emulsion, said final images including modified versions of said visual information from said emulsion, said modified versions modified in part in accordance with information captured by said electronic imaging module, wherein one or more of said final images simulate high resolution image captures by said image capture assembly that said assembly did not in fact capture. A system for increasing resolution of subject images is provided which comprises a camera operable to deliver unexposed photographic emulsion to at least one image capture zone within the camera to record visuals on said emulsion, said zone being of a variable size and dimension, and an electronic imaging module in said camera operable to record aspects of said visuals recorded by said camera on said emulsion. The system can further comprise an image data modification program for generating final images from information in visuals recorded by said emulsion and from information recorded in aspects of visuals by said electronic imaging module. An apparatus is provided for increasing resolution of subject images. A method for increasing resolution of subject images is provided which comprises delivering unexposed photographic emulsion to at least one image capture zone within a camera to record visuals on said emulsion, said zone being of a variable size and dimension, and recording aspects of said visuals by an electronic imaging module in said camera. The method can further comprise generating final images with an image data modification program from information in visuals recorded by said emulsion and from information recorded in aspects of visuals by said electronic imaging module.

It is to be understood that this invention is not limited to particular methods, apparatus or systems, which can, of course, vary. It is also to be understood that the terminology used herein is for the purpose of describing particular embodiments only, and is not intended to be limiting. As used in this specification and the appended claims, the singular forms "a", "an" and "the" include plural references unless the content clearly dictates otherwise. Thus, for example, reference to "a container" includes a combination of two or more containers, and the like.

The term "about" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

Unless defined otherwise, all technical and scientific terms or terms of art used herein have the same meaning as commonly understood by one of ordinary skill in the art to which the invention pertains. Although any methods or materials similar or equivalent to those described herein can be used in the practice of the present invention, the methods or materials are described herein. In describing and claiming the present invention, the following terminology will be used. As used herein, the term, "module" refers, generally, to one or more discrete components that contribute to the effectiveness of the present invention. Modules can operate or, alternatively, depend upon one or more other modules in order to function.

"Lens image" refers to any image or light stimulus, for example, images provided by lenses or other light delivery means existing or that will come to be in exposing image receptive media and elements to light or other simuli that are the focus of rendering displayable final images.

"At least one image capture zone" refers to within a camera, film, digital, otherwise electronic or of other types, a film gate, CCD chip or other image capture aspect or component occurs within a zone where an image, typically delivered through a lens, is manifest. This image capture zone is where light delivered typically related to an image from that lens related to the visual scene a camera user intends to capture, and typically systems of different capture zone sizes related to gauge size for film, for example, require optics and optic arrangements capable of covering larger image capture zones with a delivered image, such as 70 mm film cameras relative to 35 mm and 16 mm cameras. Within hybrid cameras, including those with multiple electronic capture aspects or capture means involving different media, (film and digital for example,) more than on image capture zone occurs within and/or relative to a single camera (or capture system.) Film cameras with "video assists" are for example systems wherein a single lens image is delivered to a film capture zone and electronic capture zone, simultaneously.

"Visual framing" refers to the subjective choice of a camera operator with regards to a desired visual, the elements of the visual to be included in an image capture, their composition, and visual boundaries reflecting the selection and restriction of the totality of what will be visible within a resulting final image from the "selected visual framing."

"Distinct information records" refers the information captured and stored relating to the two capturing and recording portions of the hybrid camera, system and method. Namely, one assembly for generating high definition key frame information, typically from a lens image, and a separate module for generating higher frequency (24 frames per second for example) full frame captures and corresponding information record, logically of a lesser overall per image data amount than provided by the separate (and thus distinct) key frame image capture assembly and resulting information record.

"Single visual scene" refers to the actual subject area to which the camera or imaging device of the present invention is trained and focused. For example, the camera pointing at a beach volleyball gameface for 5 seconds of image capture time, (as in the FIG. 4 featuring the composite/mosaic key frame face capture,) means the full frame image of the volleyball game the camera user has selected and directed the camera to capture, is the single visual scene that all imaging aspects of the camera are sharing and capturing.

"Image capture assembly" refers to the emulsion based imaging component array and film based visual storage aspect of the hybrid key frame imaging camera of the present invention.

"High resolution image captures" refer to the key frame captures of individual or composite captures related to a single visual scene, from which image information will be repositioned based on a secondary data record captured concurrently with the high resolution captures, to simulate high resolution captures that did not actually occur.

"Electronic imaging module" or "Image capture module" refers to the electronic image capture component array of the hybrid imaging system and camera of the present invention; this component array, (preferably housed within the same camera as the high resolution image capture assembly for generating key frame captures,) in the preferred configuration receives the full intended visual scene as a full frame lens image conveyed to the module either continually or intermittently, to allow uninterrupted capture of preferably 24 frames of video per second without interrupting or compromising key frame captures from the same lens image.

"Image data management component" refers to the transform program unique to this system and method, for applying positional, (such as wire frame,) selectively discerned image aspect shape and position information to create modified versions of high definition key frame information toward simulated high definition image captures, embodying up to as much information as the key frames themselves, per image.

"Image capture zone" refers to the area or areas within the imaging device (such as camera) of the present invention, where the selected full visual in the form of a lens image preferably, is trained for capture. Such a zone may include and in fact primarily does, a film gate exposure area in the film hybrid configuration of this invention, though a CCD or related video imaging device or other digital or electronic data capture device also embodies an exposure zone or image capture zone on which full or partial lens image light may be trained for electronic capture and electronic image data generation and storage in response to light stimuli affecting such an electronic imaging image capture zone.

A system for imaging is provided. More particularly, a system, apparatus, or method for increasing resolution of subject images is provided. A system and method provides records visuals and that records aspects of the visuals, such as captured by an electronic imaging module, in addition to a visual scene, referred to herein, generally as a "visual," that is captured by a camera. A visual as captured by the camera is referred to herein, generally, as an "image." Visual data and aspects of the visual data collectively provided such that data regarding variable size and dimension of the visual can be used, for example, during post-production processes.

The system, apparatus or method relates to the simulation of high resolution image captures that did not occur, from single high resolution "key frames," which can be actual image captures within emulsion or other capture media such as digital image captures. These "key frame" pictures are subsequently informed by a second data record, as employed by an image data managing computer, to modify the key frame image aspects to reposition such aspects as they "would have" occurred had the high resolution image capture system in fact captured the simulated image. For example, the system provides that the high resolution image capture system had been operating at a high capture frame rate and thus generating more original captures per second.

A digital image data transform is thus another aspect of several configurations of the system, method, or apparatus described herein. Such a transform "program" as operated by a computer, creates final images from data related to the mentioned "key frames" as informed by a second data record captured in and around the time of the key frames' origination or initial capture. In essence, a second data record, such as an electronic image capture record at 24 frames per second, contrasts with key frame creation of only one image per second, and may provide all of the positional or "wire frame" information necessary about discernable zones, such as subject objects, to manipulate, via the computer employed transform, the data-rich image aspects of the high resolution key frames to assume positional properties of lower resolution corresponding aspects within the 24 frames per second captures. In fact, the electronic image capture record, which may, for example, be a film camera "video assist" imaging component, allowing for multiple applications of such reference video destined for use by the transform computer program, need only embody enough image information to provide image zone outline information for the data rich key frames to be "modified," while potentially retaining all of their original resolution, thus resulting in final filmed images that may provide in digital form images surpassing 20 k per image, including images that approximate quite exactly those that "would have" been captured had the film capture aspect acquired images at the time that, in fact, only the lower resolution electronic capture system captured image information at the instant the modified key frame information is now simulating as an original approximately 20 k film capture; ideally the lower resolution 24 fps electronic capture system is acquiring images through the same lens as the film capture assembly of the same camera to allow visual stimuli, such as a red ball occurring with the lens image, to be easily identified as corresponding "image aspects" or zones between the film and electronically captured images. As this red ball moves from left to right through the frame over one second of time, though the film key frame captures provide only an image of the ball on the left of the frame, and then on the right, the electronic capture aspect of the camera has in fact provided 24 full frame captures documenting the ball's journey across the frame with 24 images, for example 2 k digital image captures, providing all of the positional information necessary to reposition the corresponding red ball from the first key frame, on the left of the image, where it "would have" been had the film system captured not 1 frame per second but 24. The resulting 24 images, each 20 k, in this example, now feature the ball with the proper position throughout the frame during this one second of final images. Benefits include the fact that a single frame of motion picture film and slow capture frame rate, such as an 8 perf/sprockets per image horizontal emulsion stored key frame, not unlike a "still 35 mm" camera exposure, will allow the typical 10 minute film magazine to now last many times this record time, 8 perforations of film stock being employed in lieu of the conventional 96, proving 2 hours or record time per 1,000 feet of 35 mm film stock, for example, while simultaneously increasing the resolution of final images for digital cinema or other display purposes by at least 3 times, in this example. Indeed, more for less as a result of image extrapolation from pertinent information, increasing the efficiency of application of the high resolution image information from information less material and cost intensive capture options may provide, such as a video imaging aspect, such as a video assist unit acquiring images through the same lens as the film capture aspect.

The media of the "hybrid" systems, as described herein, is not the issue. For individual key frame capture scenarios, as above, film provides a useful configuration as in the present field, no digital imaging for entertainment can efficiently provide individual image captures capable of providing electronic image information at or beyond 15 k. One valuable benefit of such an extreme high resolution record is future project value, such as the option of "re-resing" a feature film to 15 k per image, for digital projection at 15 k when in ten years, for example, the best digital screening venues are not 4 k projection systems, but 15 k. Thus, quality acquired "now" can provide the compatibility with the screening technology and quality of "tomorrow." This is not unlike being able in the 1920's to shoot color motion picture information, despite the fact that it would be years before the actual color information captured in the 1920's could provide color projected prints for audiences to enjoy the stored yet not before exploited image information. The fact being, the information is "in the can," providing future processing and/or display options otherwise lost of having to be "guessed," such as in the case of colorized black and white films. Herein, the resolution is the key, and while costly projects shot originally as 2 k data captures, such as the recent STAR WARS films, even inexpensively produced motion pictures created under the present invention, will have the capacity to provide screening data files with, as said, 15 k per image results, or much higher as the following configuration summary demonstrates.

Advancing beyond the single key frame full image capture configuration of the present system, methods, and apparatus, to follow includes specification relating to mosaic or "composite" key frame configurations of this innovation. Specifically, optics and/or capture media within a film gate, or an electronic capture modules such as CCD, have repositioning operability to allow for sequential capture of not the full lens image, or otherwise provided image, but portions of the image. In one version, the optics relaying the visual delivered through a camera lens vary three times, to allow a "triptych" of portions, to be conveyed for exposure on film or an electronic imaging module. With repeating sequence of portion captures, an increased amount of emulsion for example, allows for subsequent digital assemblage of the full visual from the portions, in essence the digital assemblage of the mosaic picture puzzle captured in distinct "pieces, to provide an ever more data-rich potential series of key frames; and as described initially above, thus equally data-rich potential "simulated" or extrapolated intermediary images, between available key frames as informed by an ancillary data capture system, such as the forementioned video assist unit. It is very important to mention that this electronic capture aspect, providing at least the shifting image aspect position information necessary for discreet revision of key frame data into proper final images, need not capture image data. Such a unit may simply capture positional data allowing for the "wire frame" study of the visual being intermittently captured as well by the key frame generating camera aspect. An example of such non-image data being captured and providing this data, is a transmission and receiving sampling device, e.g., echo or audio or other electronic transmission, returning and providing a record, or study, of the shapes and depths of objects relevant to the key frame captures, for application of such shifting shape and position data to generate a plurality of final images between available key frames, simulating the key frame capture system images had they actually been operating not at 1 frame per second, or capture per second, but at 24, for example.

Thus, configurations to follow relate to the creation of high resolution key frame, or reference images, which may or may not provide images included among generated final images. This further relates to boosting potential key frame resolution by providing the option of not only single full visual key frame image captures, on film or other media, but multiple distinct captures of sequential portions of a subject visual, concurrently with the same 24 fps captures by an imaging module or other electronic data gathering module to provide image aspect shape and positional data for revising assembled mosaic key frames into, again, simulated high resolution images to approximate intermediary images not actually captured by the high resolution key frame generating aspect/assembly of the camera and system.

Continuing the potential benefits, clearly a composite/mosaic key frame generated from 6 portions of a lens visual, sequentially, by a 2 k digital capture camera may provide key frames of up to 12 k, minus any image portion overlapping to be seamlessly corrected by the computer operated transform program. Thus, the assembled 12 k reference or key image, may as with the film originated images above, be revised as final images to provide potentially (for example) 24 of the 12 k images for every second, and every available computer assembled key frame created, from ultra high resolution composited captures (on any selected media) representative after assemblage of the mosaic image of the full desired visual (framing and composition) a system user has selected.

One unique component is the transform program mentioned. This "software" provides compositing functions to allow image portions captured as mosaic key frames of a subject visual, to be assembled seamlessly into one image. Such assembling may also rely on secondary full image, for example, "video assist" captures optionally at lower resolution, to provide proper reference to overlapping aspects of such portions, toward seamless final key frame images, and thus final generated image simulations.

The transform further may provide operability to revise high resolution, and potentially extremely high data volume image data files, based on selectively distinguished "wire frame" information from the ancillary full image captures, or ancillary positional data captures if not actual image data, potentially repositioning and repeating available high resolution information in zones where such data may indicate certain image aspects with key frame pictures appear to have moved, or been uncovered between available key frame images.

FIG. 1 shows 16 mm film stock, 112, and 35 mm film stock 114, as it is delivered to a horizontally configured camera film gate mechanism, 116, by transport component (such as roller) 102, exiting the gate as exposed film stock 110.

Gate 116 provides unique versatility and image capture quality potential for each of the gauge sizes featured, single perf/sprocketed 16 mm film stock 112 and double perf/sprocketed film stock 115. The capture ratio options, selectively slaved to available screening dimensions potentially selectable for a project, include for example 1:33 (standard TV)1:65 (plasma monitor high def,) 1:85 (standard cinema) and 2:35 (a wide screen cinema ratio,) though options are in no way limited to these sizes or dimensions.

Lens (or otherwise conveyed) image target zone 104 provides represents a dramatically larger image manifest zone than conventional 35 mm film capture for cinema or TV, which has a typical ceiling of information at 6 k, based on the 3 perf vertical stock (delivery to gate configuration) film emulsion size. Limited only by edge to edge, edge to sprockets or sprockets to sprockets space when in the horizontal exposure position, an image delivered by modified optics arrangement to the larger image target area within a 16 mm camera, will result in one option, with a 3 perf horizontal key frame image capable of providing higher image quality and resolution than standard 35 mm cinema capture, involving 3 perf exposure areas on vertically exposed stock, and thus 72 perf of film per second. Herein, the 3 perf horizontal film exposure hybrid 16 mm camera, can provide key frames (one per second for example,) providing the data basis for imparting they high res key frame generated image data within final images, (as informed selectively by 24 frames per second of digital or the electronic image or related data record.) Thus only 3 perf in the 16 mm format, allows for better final image quality of final images while increasing media efficiency of 16 mm (for example) from 10 minutes per roll to 80 minutes; this has obvious benefit and savings on a number of important levels. Further the ability to select image ratio without any distortion or compromise to the image as captured by emulsion means one will not be "compressing" images as the use of highly resolved key frames and image aspect position references provided from a video record of the same visual, basically, means that full resolution, uncompressed capturing remains entirely not data capture intensive, one "file" affecting as few as 1 and as many as over 24 final images, every second.

Similarly, 35 mm can provide image resolution and available per-image data in the range of 70 mm stock and 24 fps capture, with a single 10+ perf horizontal capture on conventional 35 mm film stock, per second. The number of key frames captures depending much on the end-user's objectives and creative/logistic priorities.

Figure 2:
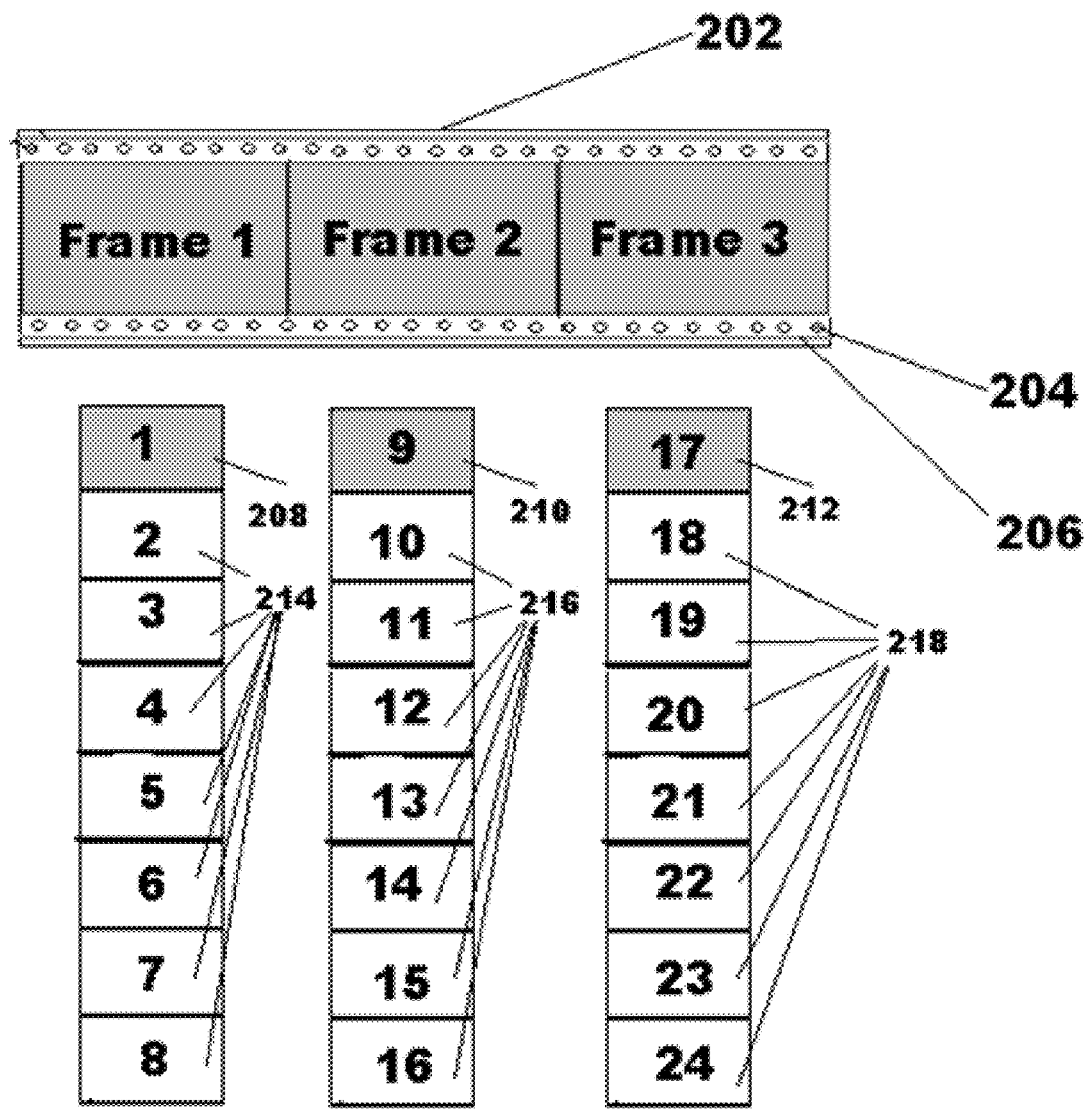
FIG. 2 shows three frames of horizontally exposed film stock representative of a full second of camera operation time.

FIG. 2 shows three frames of horizontally exposed film stock, 202, representative of a full second of camera operation time. Also illustrated are 24 frames of corresponding video in groups of 8 data files related to images, 214, 216 and 218, such as digital image information, captured by an electronic capture module working in tandem with the film frame exposures, as an aspect of the same camera, thus a hybrid camera.

206 marks and example data track, such as magnetic recordable stripe though not limited to being such, for recording corresponding non image data to provide image reference data between filmed images, 202, and the electronically captured images, 214, 216 and 218, among potentially other system function data beyond this image linking reference data.

Film 202 has sprockets 204 indicated, though one configuration involves film stock that does not feature sprockets, as images are digitized and sprocket transport is not necessary for proper subsequent registration to be accomplished in the digital domain (for example,) and thus image exposure area would be selectively increased to allow the full 35 mm height of the stock (in this instance, though any gauge size is exemplary of the system/method herein,) to record image information.

Frames 1, 9 and 17 of digitally captured information, for example, are in this example, captured at the time, or close enough to the time of the filmed images, that they are substantially identical to their corresponding filmed images, 202, with regards to the position of aspects of the images captured.

Though morphing or other inferring image generation means can allow all images between the "key frames" 1, 2 and 3 represented by film frames 202, is one configuration of the present invention, herein an approach to the fluid image aspect positioning reference data available from the 24 frames per second of video captured during the same one second of image capture time, (214, 216 and 218) allow an prepared image data transform program to reference the 24 frames of video capture for actual image aspect position data, not inferred, in allocating the potentially far more resolved, and rich in image information, image data resulting from the filmed key frames, for example, when they are digitized. Thus, these electronically captured images, will match the image position aspects of final images generated by way of this invention, however, the final images will optionally have resolution of a selectable overall amount, and overall per image data amount, higher than each of the electronic captures, for example 208, though not higher than any of the individual filmed key frames can provide, such as Frame 1 in 202, the corresponding filmed image to electronically captured image 208.

Figure 3:
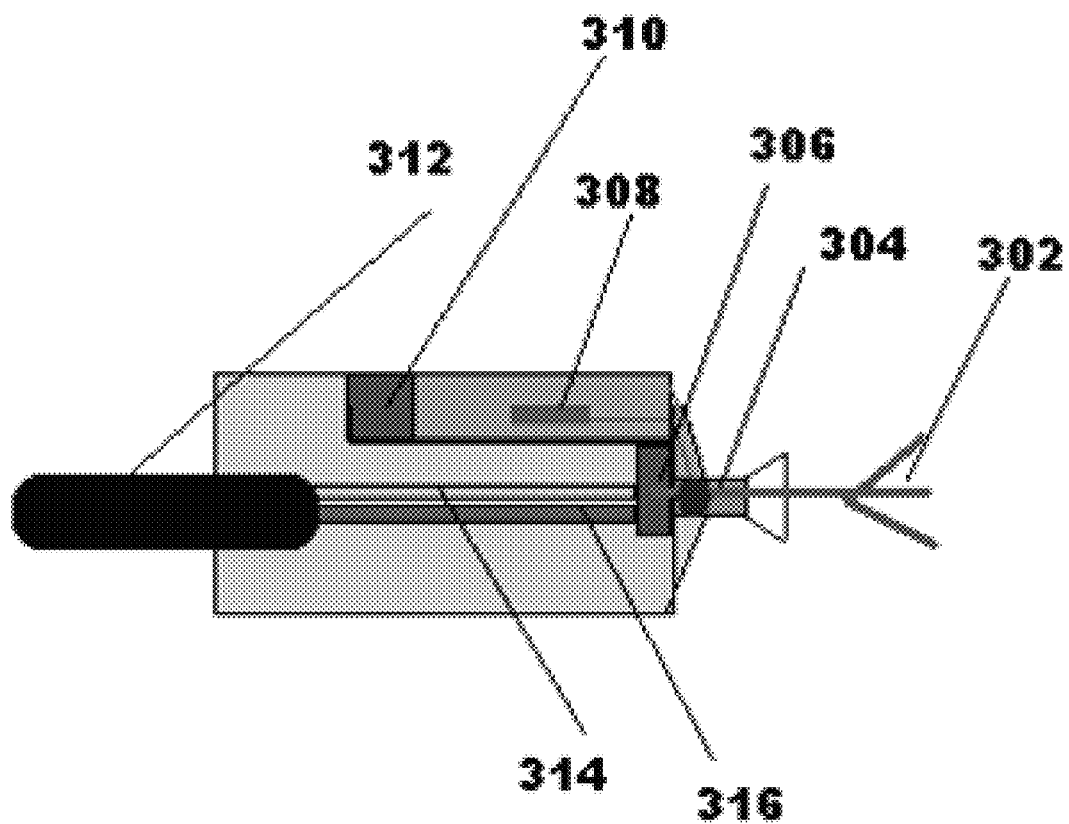
FIG. 3 shows a hybrid imaging camera, related to an embodiment of the system, apparatus or method of the present invention.

FIG. 3 shows a hybrid imaging camera, related to an embodiment of the present invention. An image, 302 enters through lens to be dispersed temporally or literally, by beam splitter, by image diversion component 304. It is important to mention, image delivery means need not be a lens, as the issue is a light or other image related stimulus being delivered for capture by more than one capture component, in this case, including an emulsion capture aspect.

Film gate 306 is a horizontally positioned gate, receiving film stock, unlike the familiar PanaVision top mounted magazine camera threading, wherein stock enters the gate from the top, exposure is between two rows of sprockets when 35 mm film is the gauge size, exiting the bottom of the gate, herein a rear mounted film magazine provides stock already in the horizontal position for exposure, much as a still film camera typically provides stock horizontally for exposure.

Image diversion means sends all or a portion of the image to electronic capture component 308 stored within tape or other data storage means 310, also storing corresponding time code data recorded onto the film stock. See FIG. 2, component 206. After processing of film stock, non image system data recorded on 206, selectively corresponding to electronically captured images, may be provided within the same final electronic media representation, such as scan and DVD, tape or digital store, though not limited to these, alongside and linked to the information relating to the original images recorded within emulsion.

Unexposed stock is delivered to the gate, 314, and returned to the magazine or other containment as 316. In this configuration, key frames are captured, one per second, 8 sprockets wide, counting one side. Thus providing key frames of at least a final image data potential of 15 k, and with one per second being exposed, the 1,000 feet of conventional 35 mm film typically allowing for 10 minutes of recording time approximately, at 24 fps, now providing a total recording time of approximately 2 hours; while by the operation of the present invention, resulting in final electronic images embodying selective aspects of the film stock images, each with a total image information threshold in excess of 15 k selectively, despite the 2 k capture maximum in this configuration of the electronically generated images, captured by component 308 and stored within 310, employed by the present system's computer program (software) aspect if not all, mostly for image-aspect shifting position information between available, more highly resolved, filmed key frames.

The present camera need not provide emulsion in the conventional, strip celluloid configuration, 312. The present invention includes a further configuration option for key frame and even full 24 fps exposure on emulsion) involving emulsion contained in a "feed" container within 312, no longer a film stock container but just and emulsion supply and take up storage component, being provided to the exposure area, or modified gate 306, in an unfixed state. Rather than a solid attached to celluloid, liquid, gel or in this configuration, a "dust", or powdered solid, may be "blown" in and/or magnetically guided into proper position within the selectably sized exposure area. Such "smart emulsion dust" may be maintained for exposure by an external influence, such as a magnetic force, though not limited as such. Like toner in a printer cartridge, computer data informs the dispersal of particles creating an acceptable image. Herein, the toner is replaced by fragments of film emulsion or other light sensitive recording material, transported for exposure randomized relative to other fragments.

Now, the emulsion can be fixed at this point to a separate component, for further operations and return for storing; though one configuration involves particles of recordable "dust" that have secondary data recording means included therein. For example, modified emulsion or visually influenced recordable particles, may have received a coating of magnetic or other recordable matter prior being rendered into a the dust, or "partical-ized" form. Such a magnetic or other data recording medium might result on each particle like chocolate on a strawberry after being dipped, covering only a portion of the strawberry.

Once intermittently influenced by a magnetic force in the exposure area, for example, such particles, some if not all, may shift position to allow the magnetic material to face down, and image recording emulsion, or other material, to face up, toward the coming visual influence, such as light related to a visual from a lens of other component, including laser units that record on to film and other such potential image providing influences.

Before, during or after the image data is captured, one configuration provides the other recordable aspect of the dust, such as magnetic coating, to be influenced by a data providing magnetic or otherwise data influencing electronic means; while the dust is fixed in place in the exposure area. Such data may record and be maintained on some, if not all, such dust particles prepared for this purpose. Thus, when re-randomized and "blown" or otherwise, such as magnetically, removed from the exposure area and placed into a containment or other area no longer maintaining the image receiving position of the particles within the gate or exposure area, the position data of each particle is maintained selectively on each particle that appropriately recorded the data, which logically would provide "which image" and "where in the gate or exposure area" that particle rested during exposure. Thus, unlike computer toner that is limited to being dispersed based on external data imposed, this "smart dust" knows it's own location relative to the images it relates to. Naturally, relating to toner itself or printing and related processes, this smart dust technology may allow printing to involve toner that does not have a limit on how discreet it might be color wise, such as three colors provided resulting in a dispersal of those three based on computer data imposed. If toner too were of the "millions of colors" option, like emulsion can record, and "knew" where it belonged independently, (down to the individual dust particle size,) that would have clear advantages. A toner cartridge holding in fact potentially many "images" just as colored dust, or dust that later may render color after a particular influence causes such a change in the "toner" or otherwise evolving color material provided in dust, powder or otherwise granulated form.

In processing such granulated emulsion, it may be fixed into place, such as onto a familiar film-like strip, or otherwise secured for those post production phases. Though, in digitizing or other image manifesting phases, the actually final images may not result until a system re-assembles the image "puzzle" after, for example, scanning the dust after it manifests it's color reaction to the original image stimulus, and the system then places that pixel or other bit of image data into the image and image position the "granule" of emulsion, or "smart emulsion dust," tells the system it belongs, from the distinct magnetic or otherwise recorded non-image data information maintained selectively within the granule itself on an added property or encoded aspect of the existing visual recording ability of the image receptive piece of a selectively small size or granule.

Image data as small as a single pixel, or equivalent, of image information may be maintained by each such granule, though not necessarily. As long as the piece of emulsion or other recordable, unfixed media "knows" where it belongs, all image data it provides will thus be able to be "placed" electronically into the correct image zone and visual it corresponds to, in post production.

FIG. 4 shows an advantage of an embodiment of the system with regards to final image quality and efficiency. 402 illustrates a conventionally captured, industry standard, 35 mm image recorded within color negative film stock. For cinema, 3 sprockets vertically of emulsion area provide the total available image recording area, which tests have revealed can provide not more than 6 k of distinct digital image data, after selective scanning to electronic data form after film processing.

406 illustrates a horizontally captured key frame of the same visual, provided by a camera with optics, or other image providing components, configured more similarly to familiar 70 mm motion picture cameras, as the image target area must be larger of the same visual to expose this much larger emulsion area. Herein, the 8 sprocket width example is a key frame taken every one-second, which will be used to influence 24 final images providing a whole second of final image data. This image, based on the 6 k tests of 3 sprocket images, thus provides over 2.65 times the image information, or more than 16 k of data per image. Further, as only 8 sprockets of film, counting one side have been involved in this image, unlike the 4 perf that occur 24 time per second of conventional cinema capture today, 3 perf or sprocket exposures typically still involve 4 perf transport by cameras, which utilizes 96 perf, or sprockets of film, every second to provide those 6 k images.

Herein, the system program provides the efficiency that allows uncompressed captures of over 16 k to occur, while resulting the in attributes and goals of compression and other data volume managing approaches, while in fact increasing available image quality and media use efficiency. For example, the 8 perf filmed key frames by way of the present invention will provide resolution and overall image data to "up-res" 24 images captured by an electronic aspect capture, such as a video assist unit working in tandem with the film capture aspect of the camera, to over 16 k per image. Thus, 384 k of image data per second versus the 144 k that 24 frames of conventional 35 mm film stock can provide in electronic form; while in this systems configuration, increasing the recording time of the same 10 minutes roll of 35 mm film stock from 10 minutes approximately, to 2 hours approximately. The advantages and costs savings potential are evident and in synch with the industry goals of increasing image quality while reducing weight, costs, media usage and equipment size. The latter being addressed by resulting 16 mm camera systems providing image quality in excess of conventional 35 mm motion picture film capture, and 35 mm systems now able to exceed once often used 70 mm film capture quality while in fact still reducing the amount of media (by weight) dramatically in doing so.

404 illustrates a wide screen cinema key frame capture requiring no anamorphic distortion to fit the full image ratio onto film for recording; a procedure not only once used to "fit" images onto film stock restricted from left to right due to vertical film configuration for cinema during capture and projection, but the issues of using more than 1,000 feet of film to capture 10 minutes of material made recording images of such large emulsion size, such as Vistavision horizontal capturing, logistically problematic. This not only from the "amount of media" necessary issues, but also from performances being interrupted by camera "roll out" after just a few minutes of operation. 404 illustrates a 22 k film captured image, surpassing the image quality of 70 mm conventional capture, though herein while increasing film roll recording time from 10 minutes to more than 87 minutes. The result, provided by the software affected (program) reallocation of data rich image zone information within image 404 to 24, for example, electronically captured images, during the same second of time, will result in final images indistinguishable from a system that may have been exposing 24 of such 11 perf horizontal image per second, as Vistavision's approach was designed to do, in part. Further, the color and image attributes of film emulsion are further provided to final images, (such as the filmic color response versus the color response found within the electronic captures,) is among the other aspects brought to the final images by the key frames to maintain the filmic response preferred in the industry and by viewers.

A further advantage clearly, is that film cameras need not be reconfigured radically, necessarily. 35 mm and 16 mm cameras may maintain their current profiles, optics experiencing a revision to provide larger image target areas toward the improved quality emulsion area captures. Thus, directors of photography preferring film capture options and approaches, including different stocks, filters and artistic options for film capture not typical to digital capture, maintain essentially all of the aspects of a "film shoot," despite the option of fewer exposure per second on film, even 1 or fewer than that, (potentially 1 for a period of time exceeding one second.) However, as the key image aspects come from the key frames, it remains a film shoot.

Again, enough key frames, 4 per second, for example, can eliminate the need for secondary electronic images to be captured, morphing or other image inferring program technology providing the inferred images between such key frames. But, with video assists being typical to film capture, the dual use or improved video assist configuration of this invention, (potentially allowing such electronic capture to cover multiple purposes, such as those video assists are designed to address and to allow such video images to actually play a roll in the creation of the final images.

Figure 5:
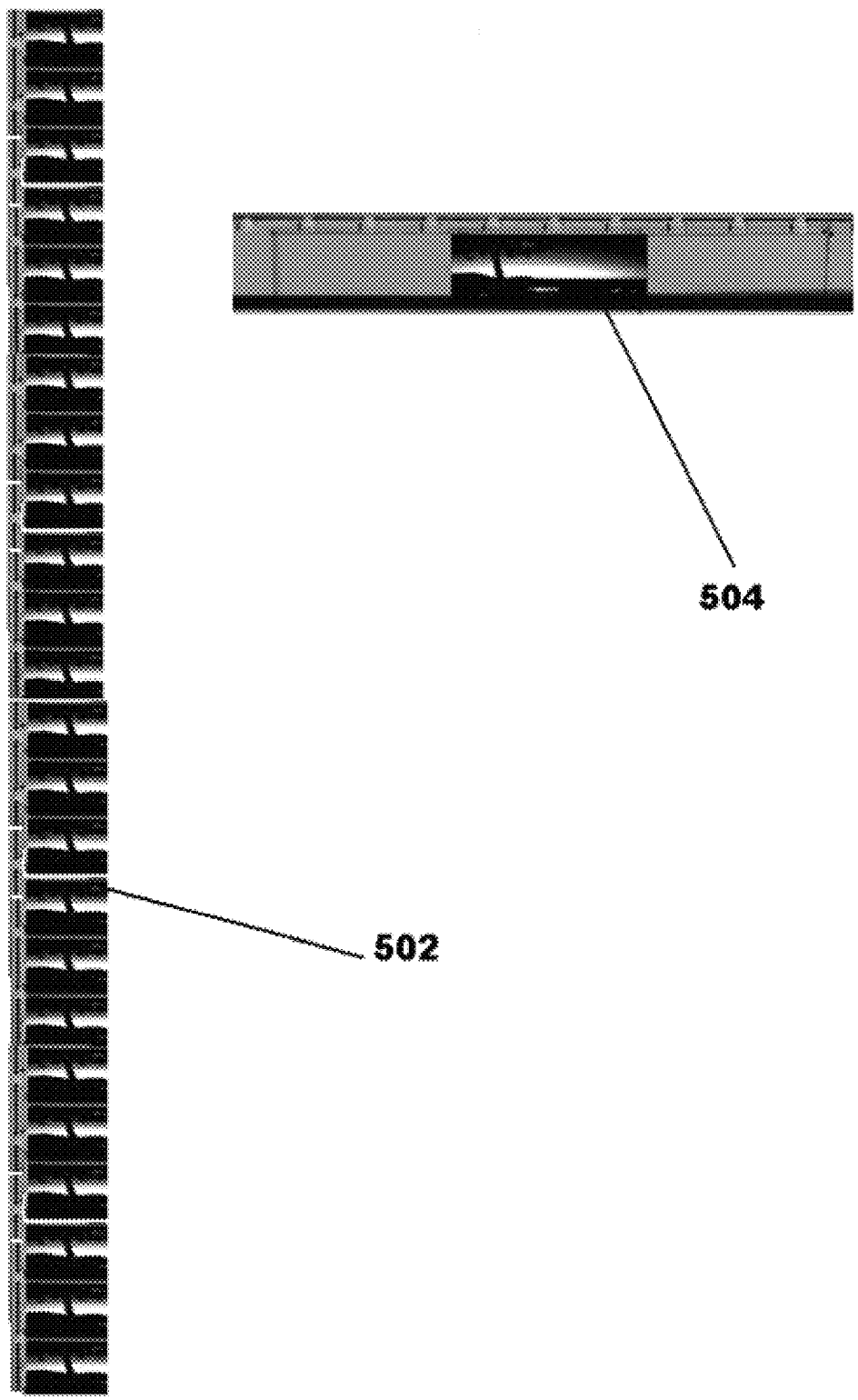
FIG. 5 shows a 16 mm camera configuration, wherein a single horizontal 16 mm key frame.

FIG. 5 shows a 16 mm camera configuration, wherein a single horizontal 16 mm key frame of 3 perf size, 504, for cinema and/or television ration images, such as plasma TV high def, results in a key frame image superior to conventional 35 mm 6 k capture, while reducing the amount of film potentially shot from 24 perf, or 16 mm sprockets, per second to 3; again increasing film roll recording time from approximately the 10 minutes a 400 foot roll of film provides, to 80 minutes while resulting in 24 images per second, each of over 6 k image data size potentially, as opposed to conventional 16 mm images, 502, that can be restricted approximately to a 2 k size, single sprocket vertical exposures in a conventional 16 mm camera, such as the Arriflex SR cameras.

Figure 6:
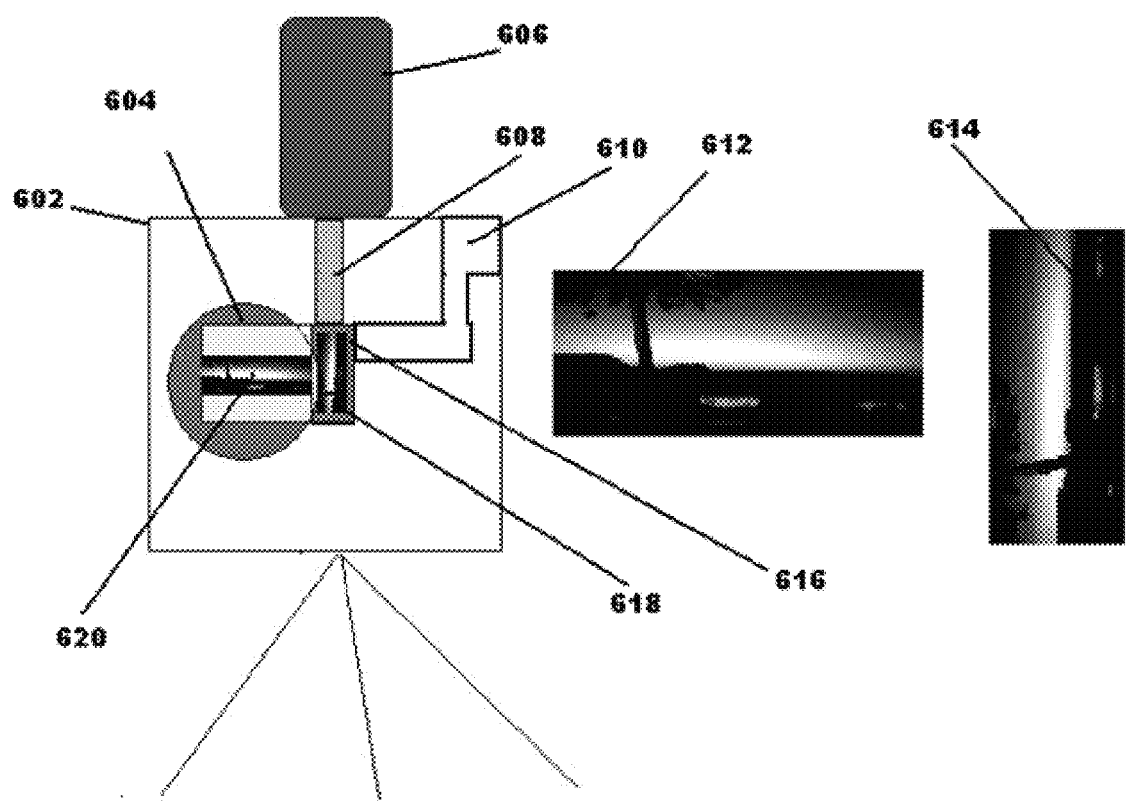
FIG. 6 shows an optically or otherwise repositioned image as captured by a film or hybrid camera for recording horizontally onto selected emulsion type.
Figure 7:
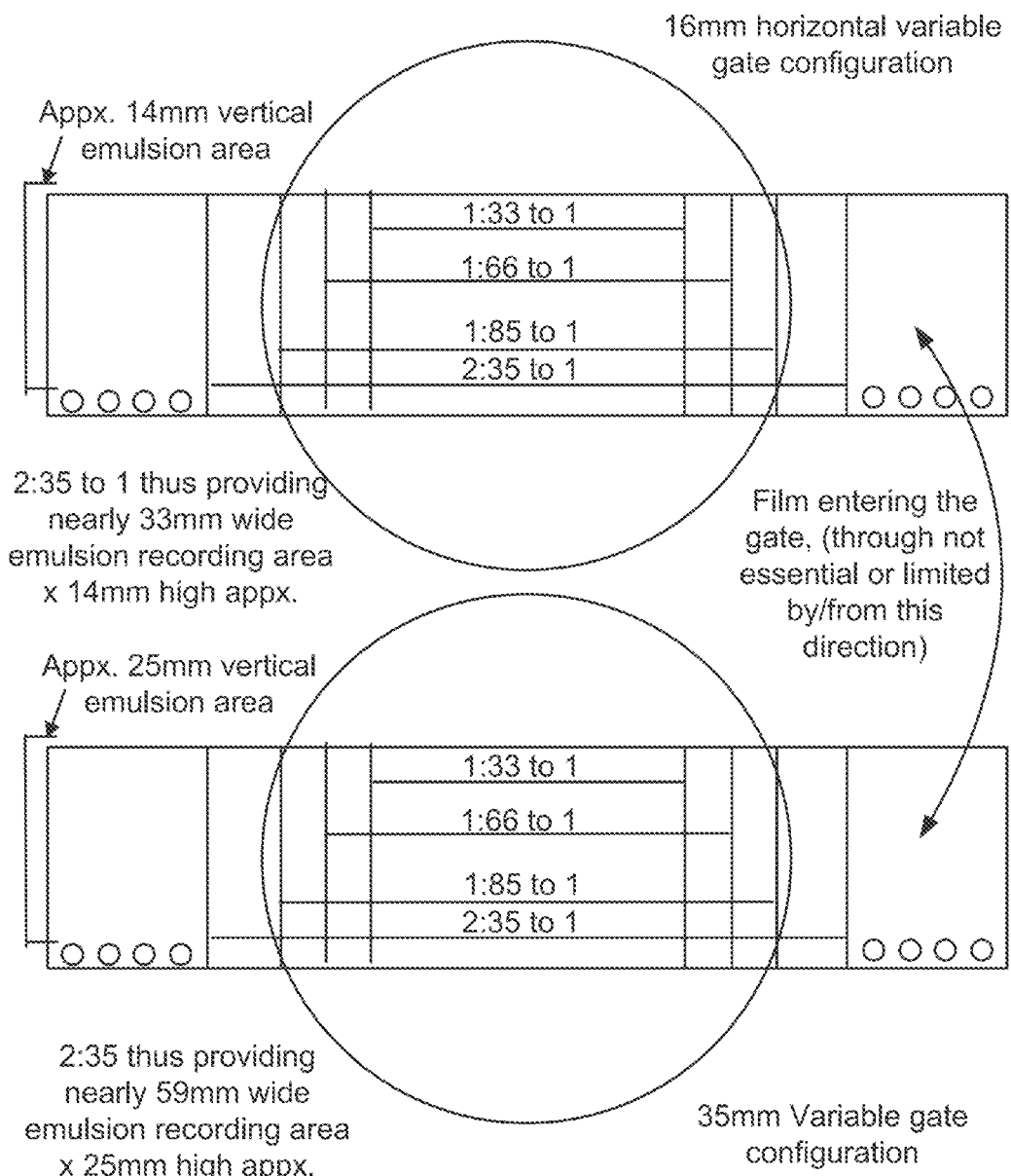
FIG. 7 shows a variable horizontal film gate in a camera.
Figure 9:
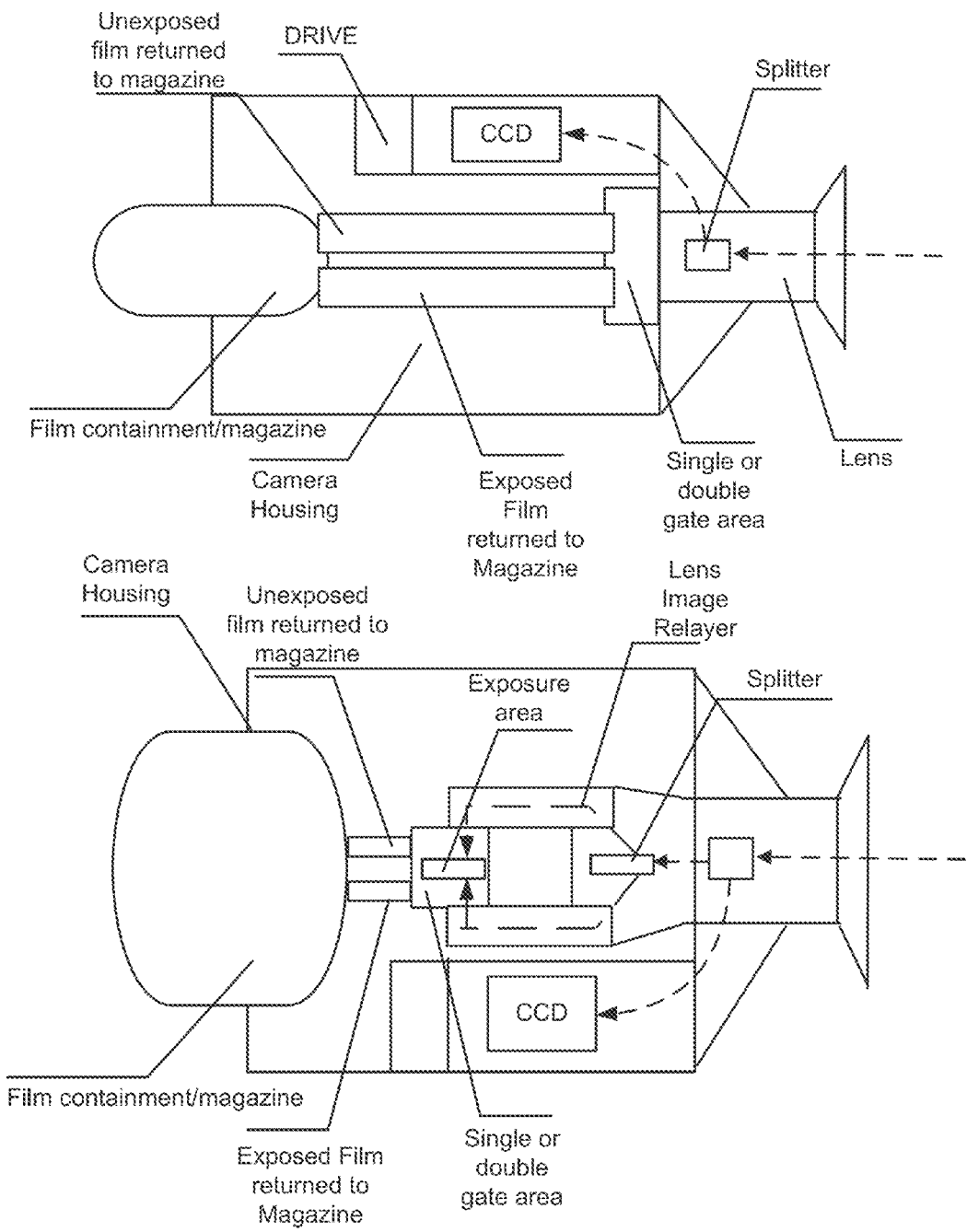
FIG. 9 shows configuration of a high definition digital unit coupled to film camera for capture of same lens image.
Figure 10:
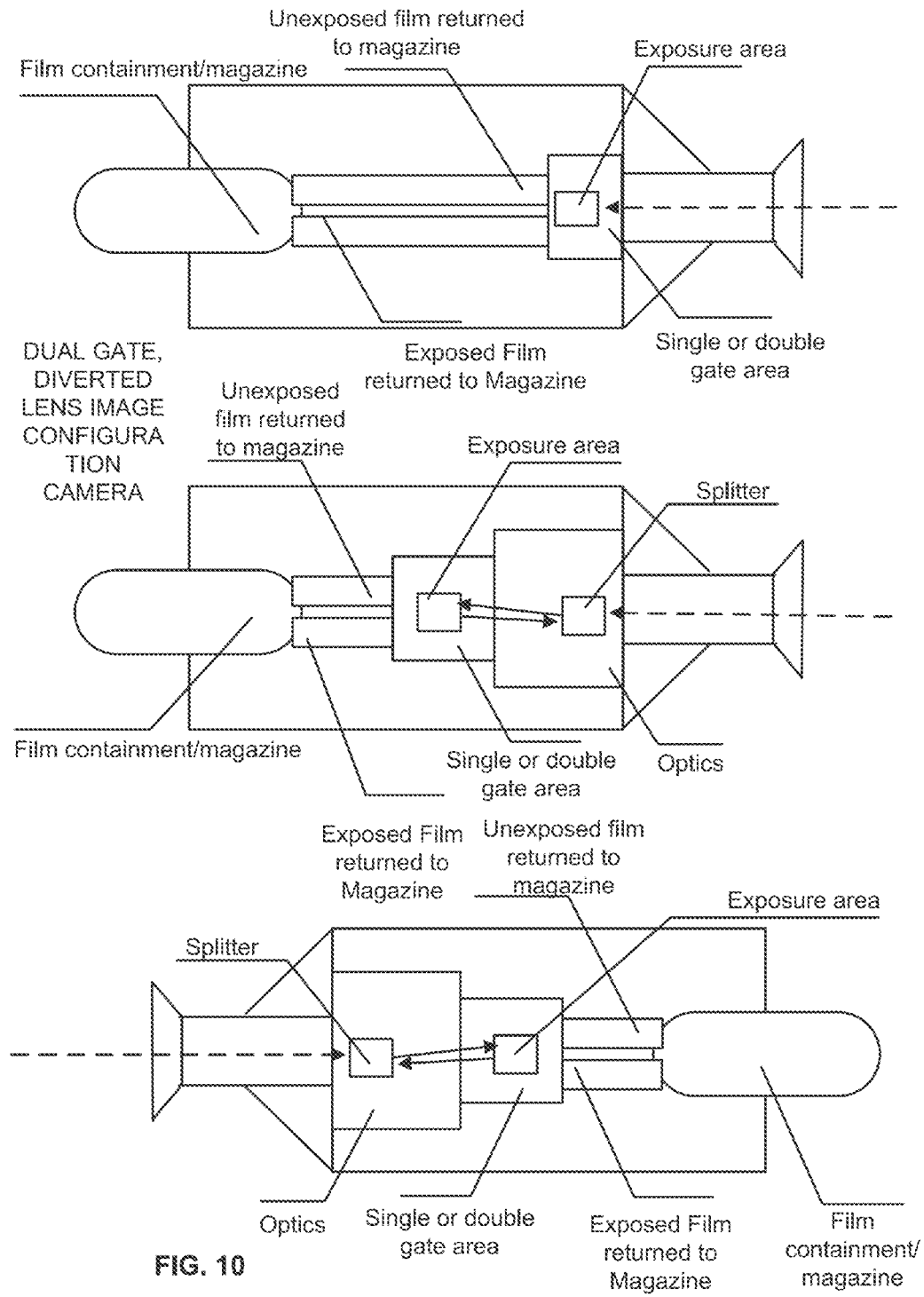
FIG. 10 shows top views of a horizontal film stock configuration in camera.
Figure 11:
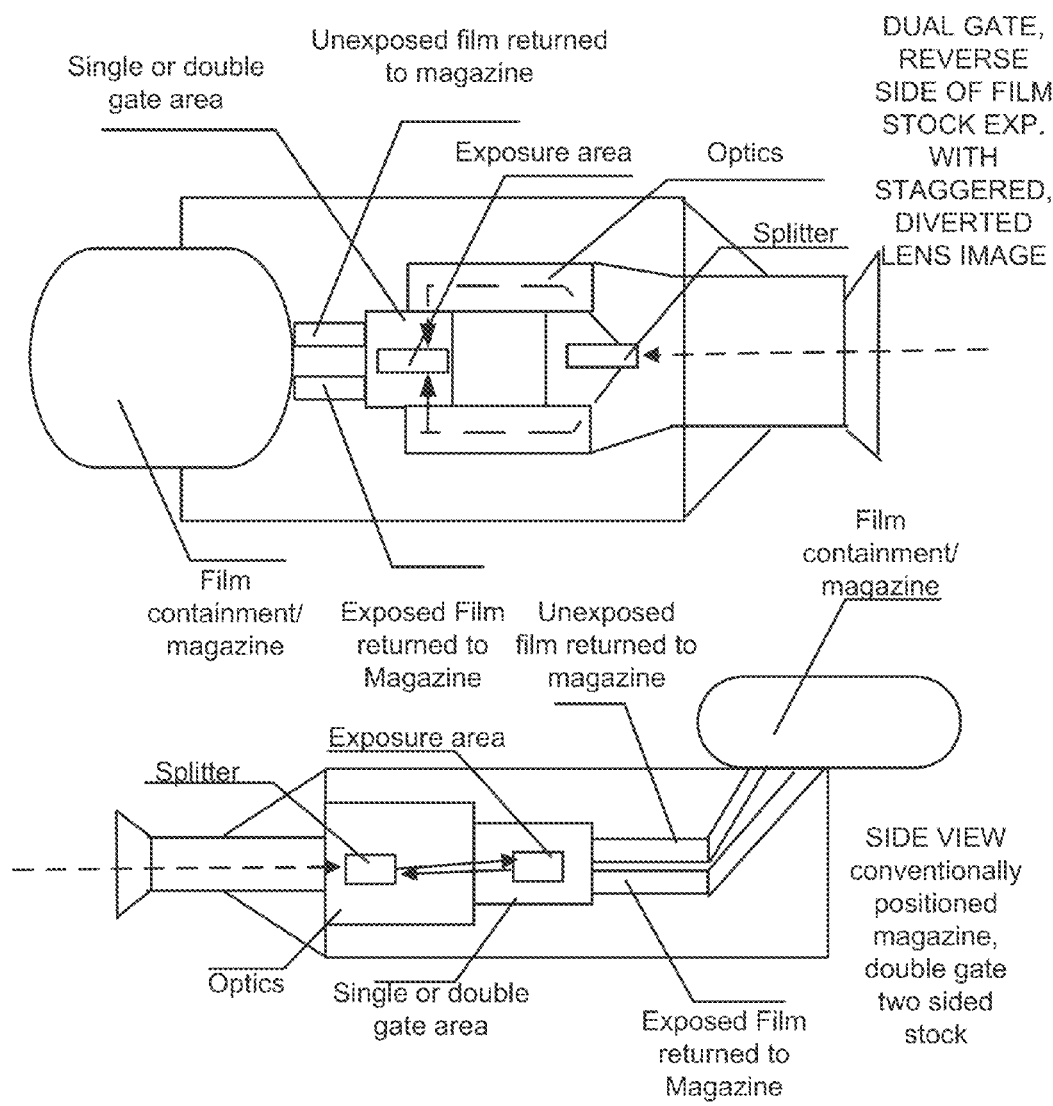
FIG. 11 shows side views of a horizontal film stock configuration in camera.
Figure 12:
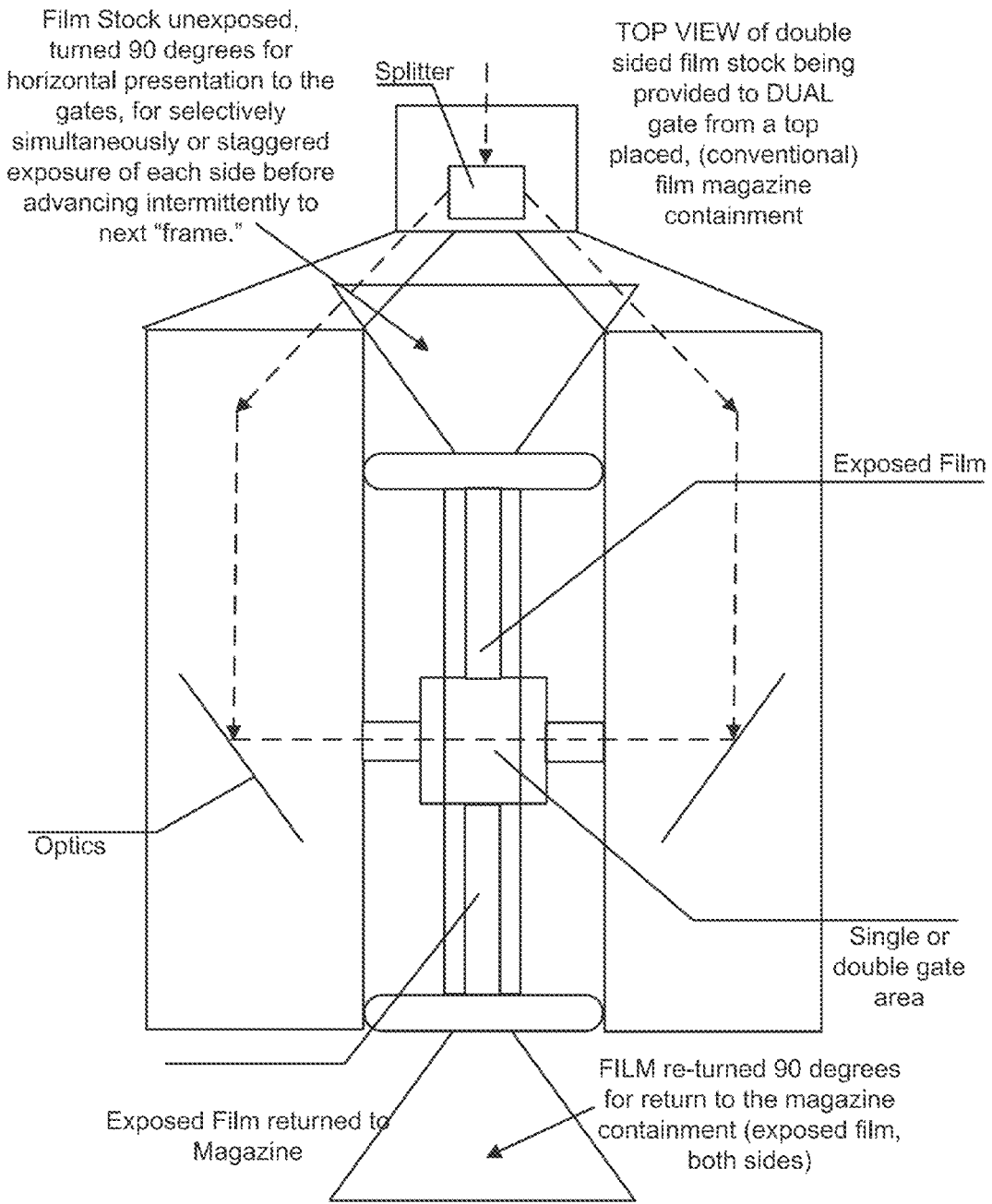
FIG. 12 shows a top view of a dual gate to expose double sided film stock in a camera.

FIG. 6 shows an optically or otherwise repositioned image as captured by a film (or hybrid) camera 602, for recording onto selected emulsion type 608 horizontally, despite vertical delivery of the stock from magazine containment 606 to the film gate 616.

In one configuration, a lens delivers a visual as image 620 to an in-camera target area 604 selectively of the size necessary to expose the volume of emulsion properly, desired. Optic element(s) and/or mirroring or other image affecting means relays said image while affecting a repositioning, for example, a 90 degree repositioning. This allows visual 612 conveyed through the camera as image 620 to become modified image 614 prior to affecting (exposing) film stock 608 within modified film gate 616, the image being recorded as vertically repositioned image 618 held within the selected emulsion prior to continuous or intermittent advancement to the next length of unexposed emulsion within stock 608, perhaps one time per second.

This configuration allows a type of film camera conventionally designed to provide film stock for exposure to a film gate from a top mounted, vertical film delivering format, to benefit from the present inventions larger, horizontally relative to a length of stock recorded key frame image onto film for affecting a plurality of final images with each key frame recorded within the emulsion.

Optionally, electronic, e.g., video, digital video, or other medium, capture unit 610 may capture selectively 24 frames of video per second, and further provide film camera "video assist" functions and benefits, while capturing the same (selectively) lens image, or other capture aspect, providing the visual stimulus continuously or intermittently to the emulsion for recording. This use of the same visual for electronic and emulsion capture may involve a diversion of all or a selected amount of the lens image temporarily to provide the light stimulus for electronic capture, or a beam splitting component may selectively extract a small portion of the lens image for separate relaying to the electronic capture aspect, reducing overall lens image light selectively used to expose the emulsion.

The electronic capture unit can be a part of the camera, 602, or working at least in tandem with the film capture aspect should the same lens or related image capture element relay the visual to the electronic capture unit within the same prescribed time period as the emulsion receives related image(s,) for example one second of time.

As before mentioned, time code data may be recorded or otherwise tracked from added or existing media information provided within the film stock and/or electronic capture media storage means, for subsequent automatic and other reference between corresponding images related to the same visual(s) to be modified by the present invention's software/program aspect.

Figure 13:
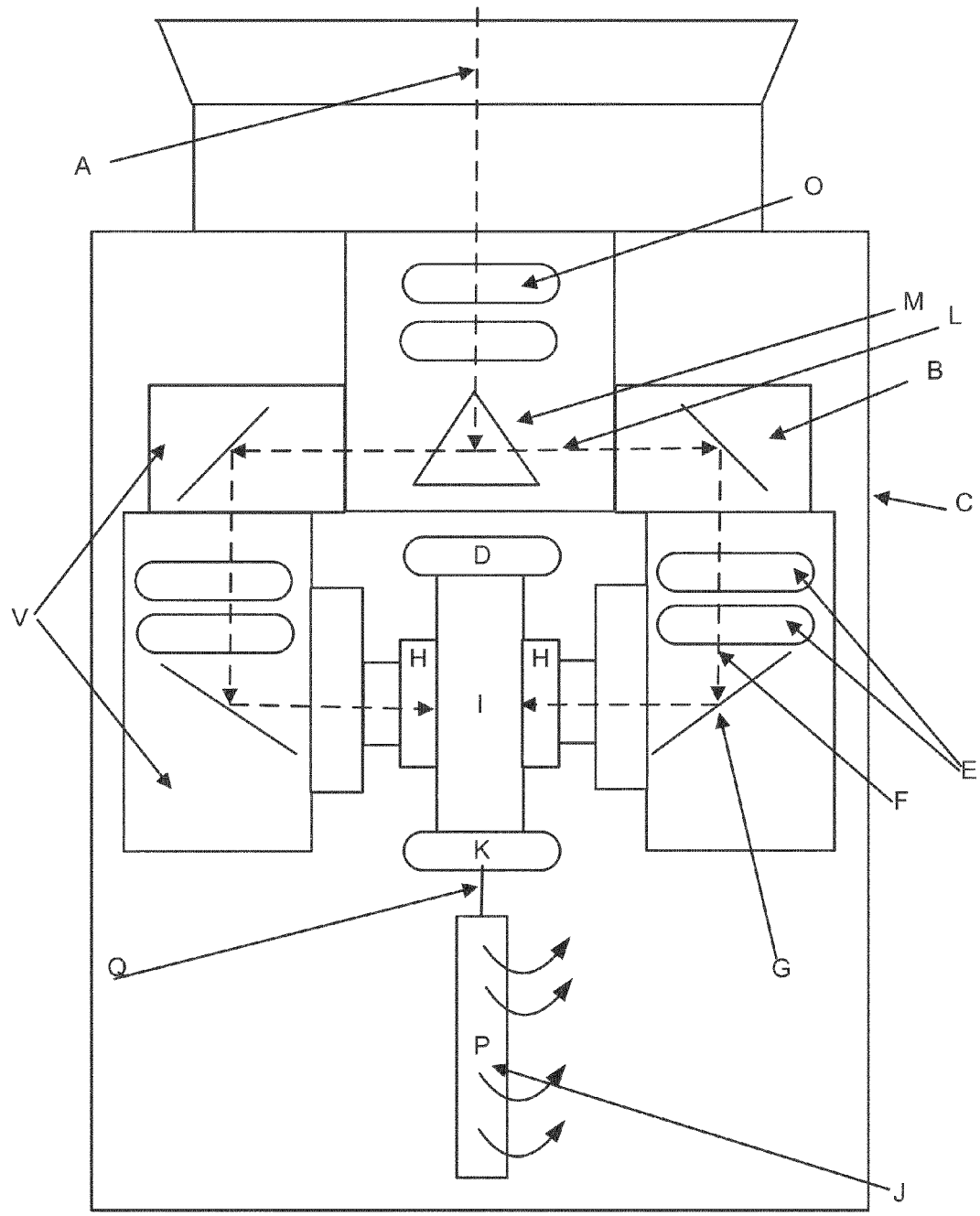
FIG. 13 shows an over camera view of a double sided emulsion exposing camera.

FIG. 13 shows an over camera view of a double sided emulsion exposing camera. A. Original lens image; B. Mirror or other relaying means to send diverted of divided lens image toward offset gate to expose one side of the film strip; C. Camera housing; D. Roller for returning film to magazine, selectively twisting the film 90 degrees, to reposition it as film coming out of a non-offset gate would foe provided by a film magazine; E. Selective optional secondary optics and/or exposure means to affect the lens image, including the ability to focus the lens image uniquely; F. Lens image or portion thereof selectively affected or not by secondary optics and affecting means; G. Additional selective lens image diversion means, such as a mirror, toward exposing film within an effect film gate; H. Film gate; I. Offset film containment and management, optional; J. Film being returned to the magazine, exposed; K. Roller to selectively repositioning film for return to film magazine; L. Diverted and/or divided lens image, after mirror or beam splitter affect on lens image; M. Lens image after primary optics, such as "zooming" are imposed; N. Beam splitter and/or variable mirror for relaying all or part of the lens image to more than one location, for selectively intermittent (or continual) relaying to media; O. Primary optics, such as zooming; P. Film from magazine moves toward roller and gate; Q. Film twisted 90° by roller means (or other)

Figure 14:
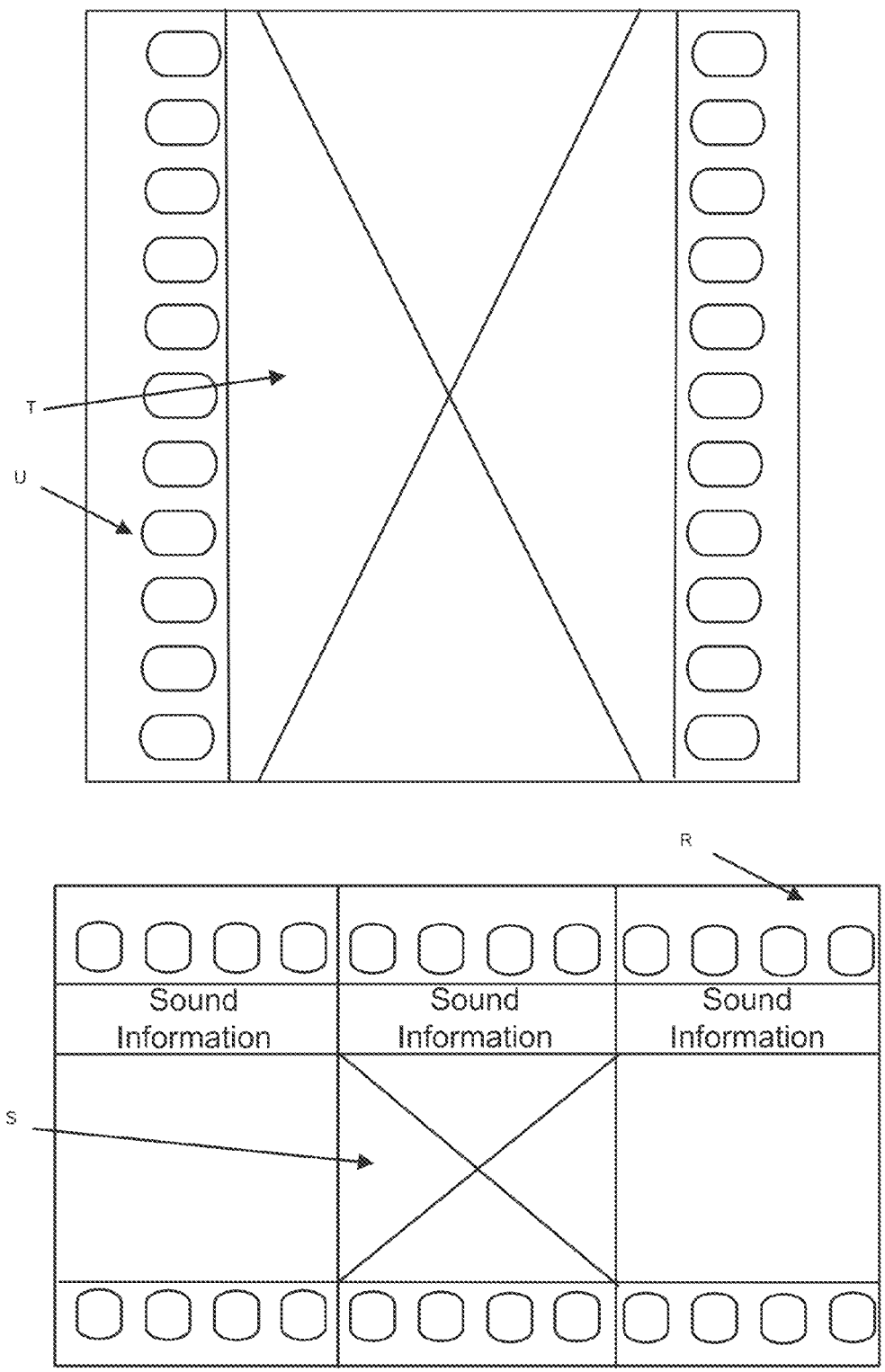
FIG. 14 shows enlarged 35 mm film stock.

FIG. 14 shows enlarged 35 mm film stock. R. Enlarged 35 mm film stock, Vertical as it approaches film gate for exposure in conventional film camera; S. Image recording area for a selected cinema dimension; T. 3 mm film (enlarged) in the horizontal position as it approaches film gates (both sides) of the present invention; U. Image recording area more than 4× that of conventional 35 mm filmed recording. Total recording time of 1,000 ft of 35 mm, double sided stock, in this configuration is minutes.

Figure 15:
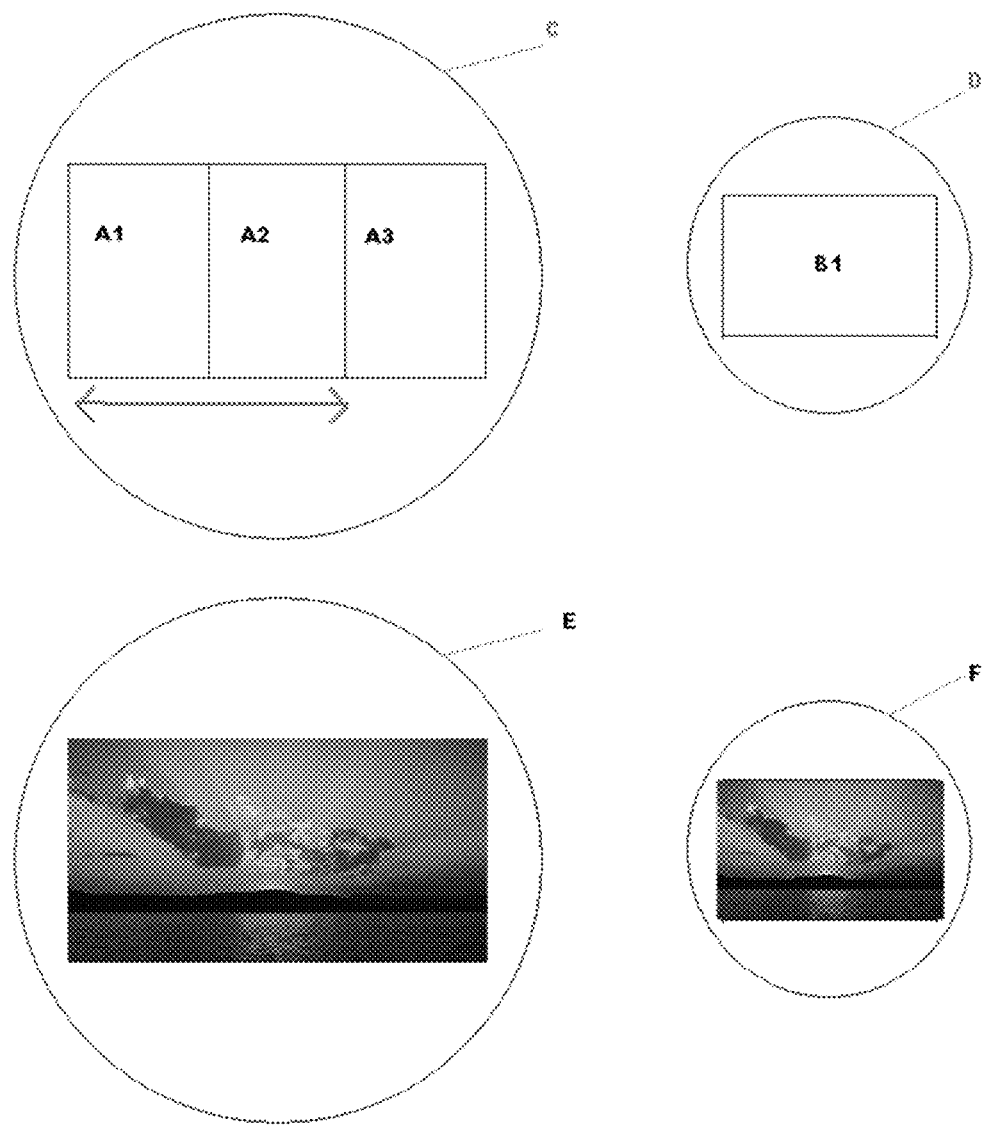
FIG. 15 shows an embodiment of a hybrid imaging system configuration of the present invention.

FIG. 15 illustrate a hybrid imaging system embodiment of the present invention. A conventionally placed electronic imaging element, such as a CCD, hereafter this element will be called the "chip(s)") may be selectively (and not essentially) repositioned, 90 degrees, A1. Thus the rectangular dimension of the capture device, typically relaying information for a 1:65 to 1 dimension monitor display, may provide a similar 1:65 dimension coverage in a different way, as illustrated by A1, A2 and A3 when factored collectively as a single imaging plane within a larger lens image target area than is conventionally provide for such a chip(s).

The vertically positioned CCD, or other light sensitive electronic imaging device positioned typically in line with a lens image, when "moved" left to right, continually or intermittently, though any motion allowing for clean capture of a new portion of lens image C is primary, e.g., from A1 position to A2 and then A3. After repositioning, the chip(s) will cover at least the 1:65 to 1 when moved from one side to the other, (left to right, or vice versa,) a three-stop coverage of a larger lens image area may allow for a single chip (or array of 3 chips, if color is fragmented) to provide as few image captures as the operator may desire within a single second of time; in this example, three in one second. As few or as many separate image "portion" captures may be acquired within configurations of this system, the more captures made creating a more fragmented "mosaic" or puzzle version of the lens image and also providing potentially more image data for an ever more highly resolved "composite" or mosaic key frame, which may be assembled from the distinct image portion captures under functions of the present invention.

During the three-stop capture of a lens image that is large enough to cover the entire zone through which the chip(s) or other capture element(s) will move, a secondary function of the hybrid system is to capture a more frequent sampling of position information of aspects within the lens image, as they shift during that second of time.

In a further embodiment, capture a sampling of position information over time is accomplished with a second imaging device, B1, receiving a portion or all of the same lens image, either continually or intermittently; during the second of time the other capture device is moving and capturing "portions" of the lens image, on a second imaging plane. This diversion of the lens image to another imaging element to capture the entirety of the image area being also sampled and converted to electronic data/signals by the moving imaging element, provides a constant (24 fps for example) record of the entire desired framed image for at least "positioning" information related to image aspects as they shift potentially, during those 24 frames captured in a second of time.

Several goals are accomplished by way of the moving chip configurations potential of the present invention. Video cameras, including digital cameras, either still or for entertainment imaging, may employ capture elements of conventional resolution potential in providing image information resulting in final images with resolution potentially many fold beyond any known stationary chip imaging devices available. For news organizations, for example, as their video camera captures relatively simultaneously a full frame video capture 24 times per second, the "mosaic" or moving CCD assembly of the camera herein may provide (as with this example) only three additional images for storage and relay, via satellite if in the field, in resulting in 24 final images per second with nearly three times the image information each, as any one of the 24 initial full frame image captures; factoring potential overlap between the mosaic image portion captures and considering the chips all have the same resolution potential, (2 k for example).

E and F demonstrate the different sizes of the lens image versions relayed to the different imaging planes within the camera, wherein distinct imaging elements (chips) A and B capture the same visual; one as full frame captures and the other capturing three portions of the visual, moving to do so, resulting in all the information for program implemented by an image data managing computer to reassemble a seamless final version of the visual, e.g., sunset, with as much as three times the image information as a single full frame capture affected by B1, given A and B being identical chip/imaging element types. FIG. 1 illustrates that the mosaic capture is affected by a chip with double the data capture means of the full frame imaging chip, and demonstrates that the resolution of the full frame imaging chip capturing the "positioning" data, as discussed below, need not be comparable to the one involved in capturing the series of partial image captures. The partial image captures are responsible for the true final resolution of all final images provided by way of this invention.

It is important to say that the hybrid camera, with secondary full-frame capture of 24 fps data may be affected by non-imaging data sampling means; as long as a continual discreet record of elements being photographed and any change of position they incur during a selected number of samplings over a single second of time. For example, a signal transmission and receiving sampling device, resulting in even a wire-frame representation of the lens image and/or scene captured by the lens (or other imaging means) would be an example of a potential replacement of the second imaging unit (full frame,) providing all of the data necessary to affect final images and working in tandem with the partial image captures to provide data necessary for subsequent computer assemblage of those final images.

FIG. 16 shows a hybrid imaging system configuration as an embodiment of the present invention. As the conventional 24 fps captures provide the "wire frame" image aspect position data, the richer Key Frame data, by image zone, can replace image data in every one of the 24 images with exactness, resulting in 24 images each with up to 12K data. These images are indistinguishable from images of the same scene from a hypothetical camera, not yet in existence, with a 12 k image capture capacity.

Figure 17:
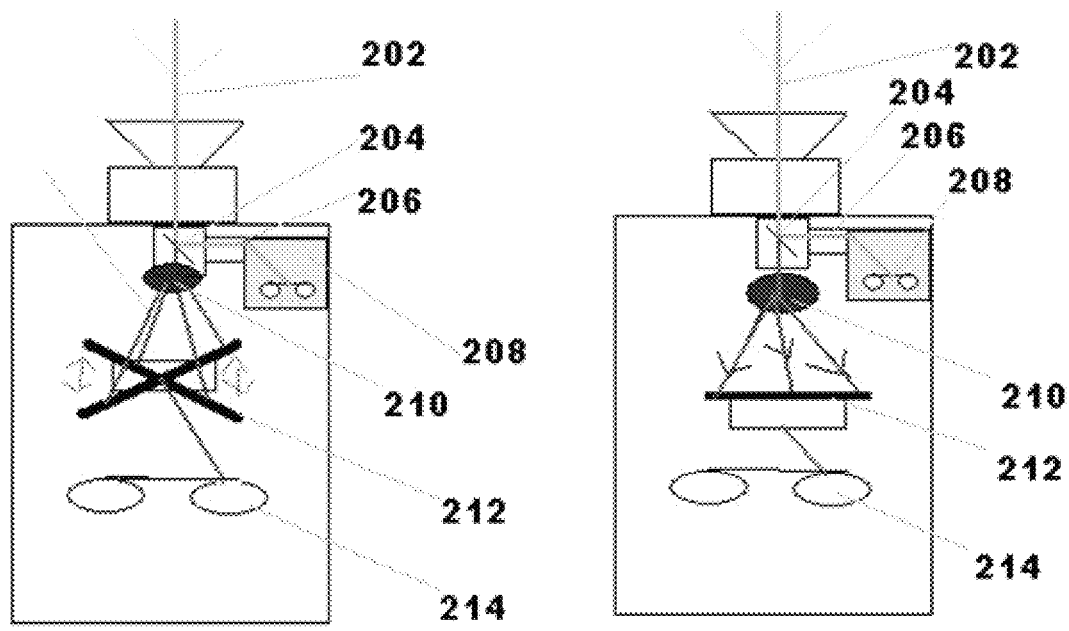
FIG. 17 shows the moving and static configuration potential of the electronic imaging element.

FIG. 17 illustrates the moving and static configuration potential of the electronic imaging element, such as a CCD, and optic element, such as lenses/mirrors, to achieve the mosaic key frame capture and store the result.

Lens image, 202 enters the hybrid (full frame/partial frame capture system) camera, encountering image diversion component 204, e.g., mirror/prism or other aspect. Full frame capture element 206 captures and relays for storage the full frame image data, to storage means/component 208, e.g., drive, tape or other.

Optic array 210 relays the selected portion of lens image 202 to partial/mosaic image capture component 212, which may be static or move in a selected direction or directions in order to function in tandem with image portion relaying component 210 to cover the selected number of image portions to form the desired mosaic key frame image result. The present example of the motion potential these components is not limiting, as they may move even in complete circular motions potentially, in a configuration, in relaying and capturing the cycle of image portions representing the full frame image captured distinctly 206.

Once again, the entire 206/208 assembly, potentially similar to a "video assist" aspect of a camera, may be replaced potentially by a different data sampling means working in tandem with the captures affected by 212 and stored by drive/tape or other storage means 214. Therein, as long as a proper record of image aspects' shifting during a selected duration affects final images assembled from key frames (created from data captured sequentially by 212) provides the seamless aesthetic result, e.g., of 24 fps of fluid video with the data thresholds of the full key frames.

Figure 18:
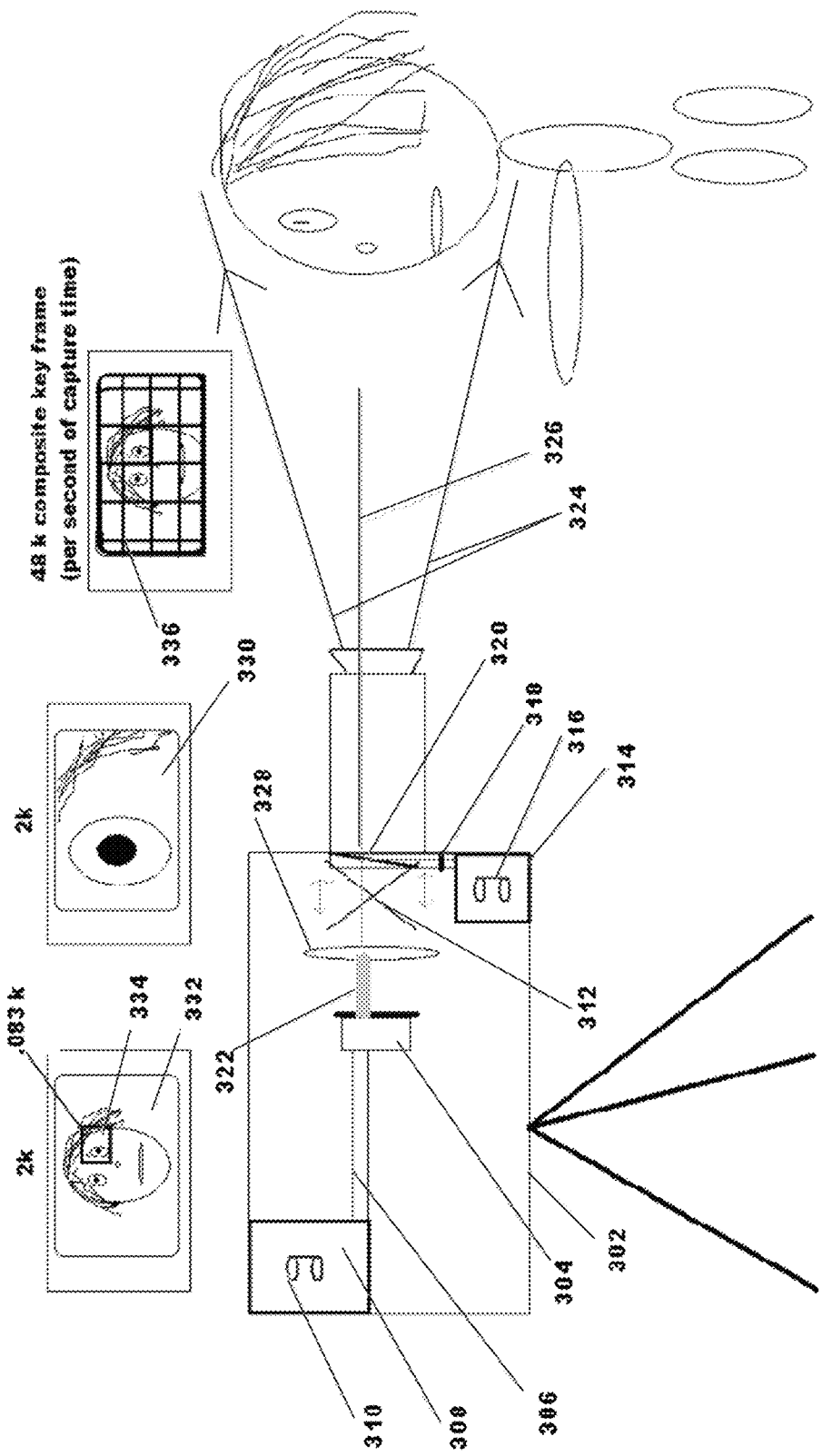
FIG. 18 shows a camera configuration of the mosaic capture function as an embodiment of the present invention.

FIG. 18 illustrates another camera configuration of the mosaic capture function as an embodiment of the present invention. Herein camera 302 is delivering lens image 324 to two distinct imaging elements, 304 and 318, for example, CCD imaging devices. Lens image diversion means, 320, for example, a mirror, delivers the full intended framed image, represented on monitor 332, to imaging element 318 for storage on drive, tape 316 or other image data storage component, 314.

Optical element(s) 312 and/or 328 represent both a magnifying of lens image portion 326, into relayed lens image portion 322, represented on monitor 330, and a preferably intermittent shifting of the portion of the lens image being delivered to the now static imaging element, such as CCD, 304. Herein 24 distinct portions of the lens image 324 are captured by element 304 within a single second of time, relayed 306 to image data storage component 308, which is a drive, tape 310 or other image storage means.

As imaging component 318 captures 24 full frame images of the entire desired lens image, 324, a program distinct to this invention operable by a computer reassembles the image portions stored by 308, in essence reconstructing the puzzle of the lens image, as seen on monitor image 336. The benefit herein being, that as optical elements 328 and/or 312 complete their "sweep" of the image area to deliver the 24 distinct, clean image-portion captures to imaging device 304 Imaging device 304 has in fact captured a mosaic "key frame" with as much as 48 k data, e.g., if 304 is a 2 k capacity imaging chip.

Thus, informed by the "wire frame," or changing positioning of the elements within the overall image, recorded as full frame data by 24 fps capture store 314/316, the program can create 24 fps final image data that applies the potentially 48 k data, in this example, to each and every of the 24 final images, allowing for enormously data rich final images; by using a single image per second, for example, to provide resolution and 24 frames per second of standard resolution captures to provide the positioning data for shifting elements captured within lens image 324.

Again, the ancillary capture aspect, 314/316, may be as simple as a "video tap" adjunct, to the camera. However, this image aspects' positioning data may be captured as literal image data or as wire frame data acquired through a non-imaging sampling means, radar, sonar, and other send/receive systems for collecting position data within a selected area, are some examples.

So, just as a "zoomed in" still camera with 5 megapixel capture means, still captures that much data even if it is zoomed in to a portion of the lens image, optically, the present invention allows for several of such "zoomed in" portions of the overall lens image to be assembled to create a tandem visual; if 4 portions of the image are captured thus, a final still image of up to 20 megapixels is the result. In a still camera configuration, a single full frame capture may be followed by a quick series of image portions affected by shifting optics, to provide the image portions to be "pasted" into the proper position, represented by the single instant taken by the one full frame visual/capture; which preferably occurred just prior to the image portion captures, if not during.

The computer program of the present invention, as operated on an image data managing computer, factors potential overlap within the mosaic/composite captures and seamlessly recreates a full frame visual, of the lens image with several times the resolution (and data threshold) of any single capture affected by the chip(s). Further the computer and program manage data provided by the "image aspects' positioning data samples," preferably secondary full frame captures of the lens image, to allocate the highly resolved composite key frame data over 24 final images, shifting the highly resolved elements of that key frame image based on true image information informing such element's shifting positions, provide by the full frame captures, or other positioning sampling means working in tandem with the mosaic image capture aspect(s) of the camera.

The advantage to optical elements, or other image diversion means, delivering the subject image, or light, to the capture element for mosaic capture, is that the target area for the light (in this example the light of the lens image) need not be enlarged relative to what is normal. Herein, the stationary chip(s) receive the conventional lens image coverage, with the "shift" in what aspect of the lens image being conveyed to that chip(s) being affected/altered optically until all portions of the image comprising the desired mosaic image, (be it 3 portions or 24,) are covered and recorded. The present example provides one complete mosaic/composite key frame every second, as the secondary capture element provides 24 frames of full frame information. However, the frequency of each key frame being generated relative to samplings of image aspects' shifting positions within the frame, is entirely selective.

Figure 19:
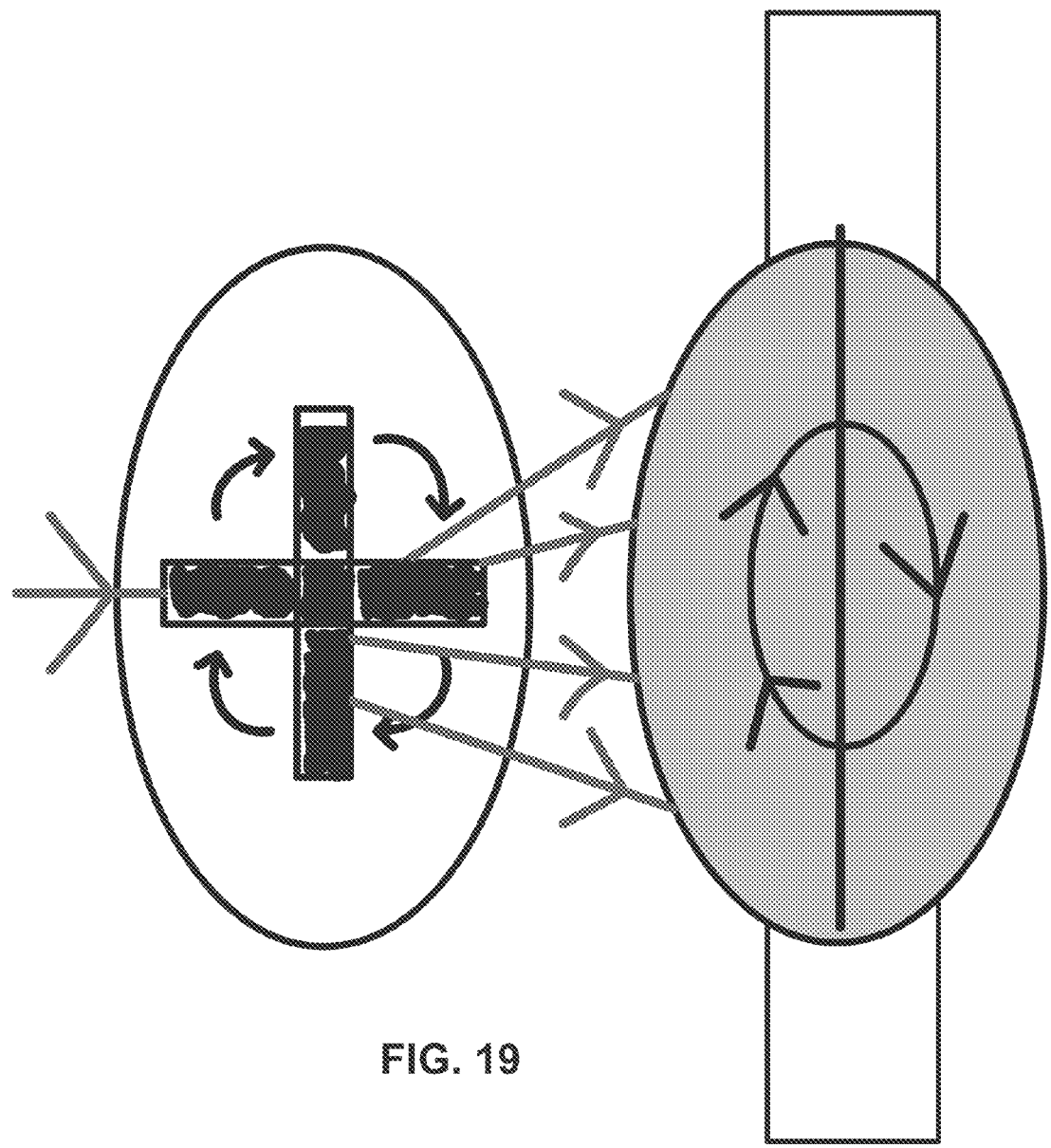
FIG. 19 shows an assembly of rotating imaging elements, e.g., chips, working in tandem with moving optical components.

FIG. 19 shows an assembly of rotating imaging elements, e.g., chips, working in tandem with moving optical components. High speed motion picture cameras include moving elements, such as optic elements, to provide static images onto moving film, foregoing aspects of intermittent transport to facilitate faster transport speed through the camera—while maintaining sharp image captures. Herein, a further configuration of the present invention replaces intermittent, or "stop and go" motion of imaging elements (chips) and/or optical elements, such as lenses/mirrors, with an assembly of rotating or otherwise moving chip(s) working in tandem with moving optical components, to deliver sharp image portions to at least one chip (or imaging element,) varying the portions of the lens image captured with intermittent motion being selectively replaced by fluid tandem motion of cooperative components that complete a cycle of a (preferably variable) number of image portions to create a mosaic key frame, before repeating the cycle, for example, every second.

Figure 20:
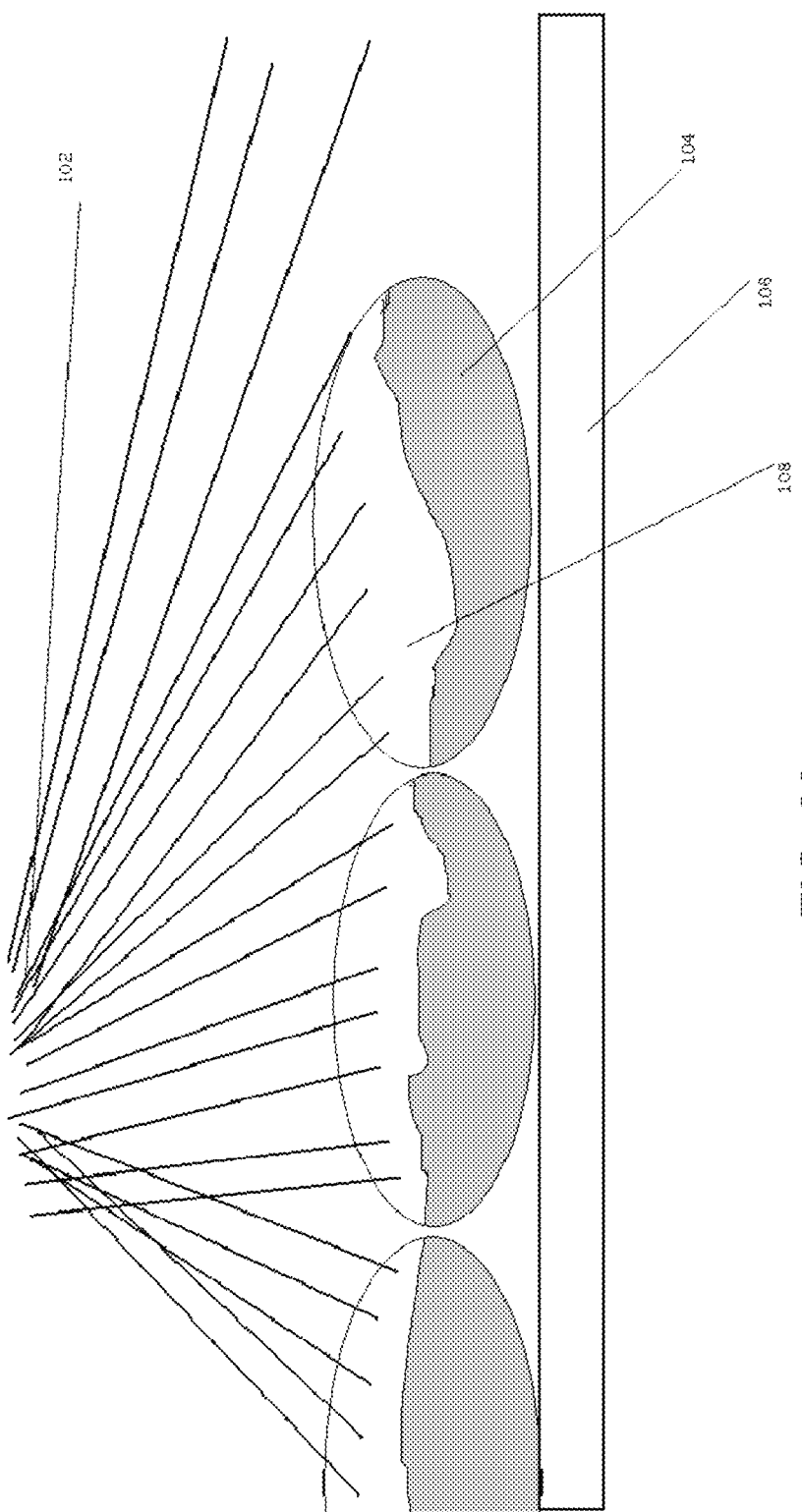
FIG. 20 shows several recording particle "elements" comprised of an image recording media component and a non-image data recording material component.

FIG. 20 shows several recording particle "elements" comprised of an image recording media component, 108, and a non-image data recording material component, 104. Herein these components are shown mutually fixed within each independent, unfixed element. These elements are freestanding, (granules or particles are reasonable terms related to these small recordable bits,) and a physically repositioning affecting means places these elements at random within the exposure gate in selected density and general dispersal basis. These elements rest in an exposure gate, 106, herein, but prior to this resting state were, for example, blown into this position or magnetically moved to this exposure gate resting state and following exposure to a light stimulus, 102, the elements are again similarly moved out of this gate area to allow for a new group of elements to be positioned in the gate for a subsequent image exposure. Containments, in one embodiment not unlike the toner cartridges of printers, may provide the unexposed elements destined to the gate, and the exposed and recorded component bearing elements out of the gate, to another containment.

Thus in either containment the elements are randomized. The data recorded by gate electronic recording aspect, such as a magnet, 106, affects the non-image data recording element, 104, for example with specific reference data related to the resting position within the overall surface area of the gate, during exposure. This "where in the gate was I during exposure" data, corresponds thus directly to the position within an "image" provided to the elements, and thus a final image as well, as the image is being provided in the light stimulus provided to expose the image information, in this configuration photographic emulsion, 108.

Non-image data recording material, 104, for example, magnetic recording media, further stores information provided by gate electronic recording aspect 106 related to what image an element is related to, among a plurality of images representing individual distinct exposures to the light stimulus. The exposed elements containment from which the elements removed from the gate are sent and maintained, in this configuration will hold a large number of randomized elements later to be allocated by computing means and a distinct image data managing program, to the correct final image and the correct point, (in this configuration pixel placement,) within the overall image.

Figure 21:
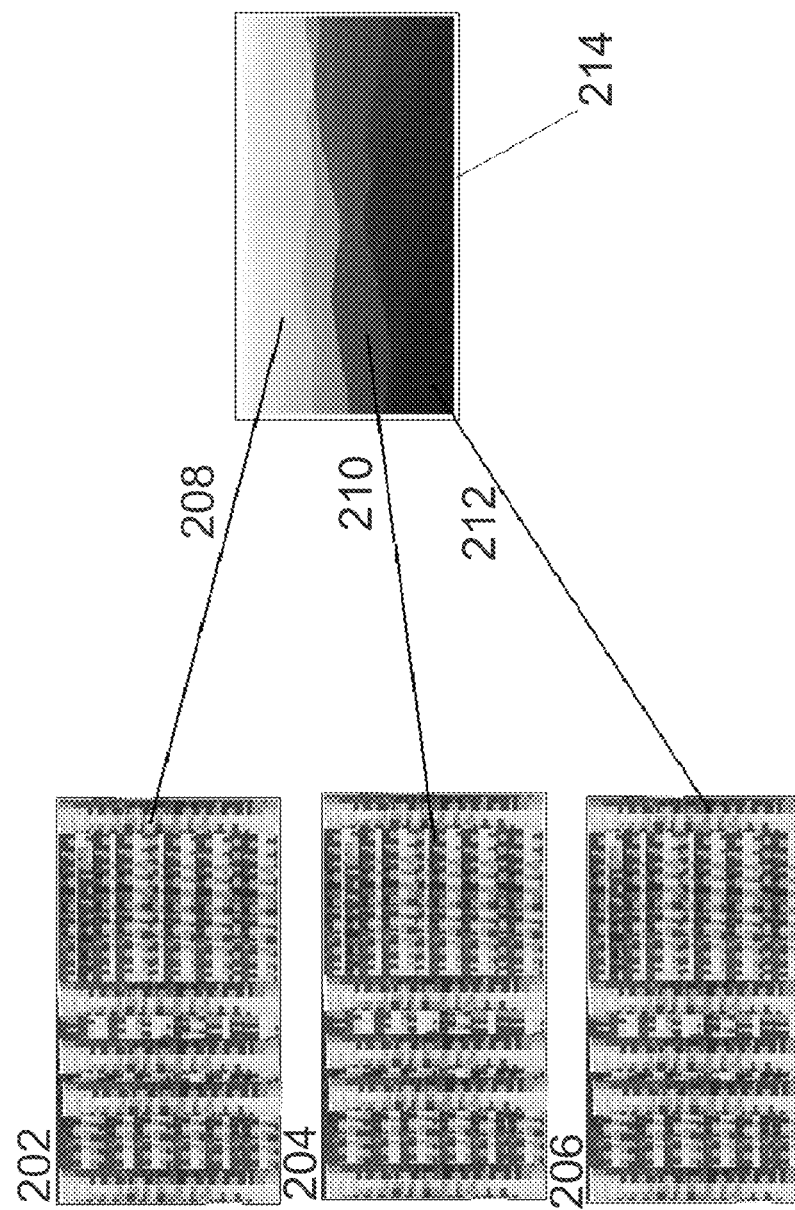
FIG. 21 shows three groups of processed and digitized image data components of a large number of elements.

FIG. 21 shows three groups 202, 204, 206, of processed and digitized image data components of a large number of elements, given that potentially an element may hold as little data as that corresponding to a pixel or the equivalent, though larger element component sizes are indeed fine based on the aesthetic discretion of the desired system.

These groups in the present configuration, (though not only option,) are elements spread to a thin, one element thick, layer on a containment surface. This containment herein is to allow for more conventional emulsion processing and digitization. This containment also allows for uninterrupted subsequent reading of the non-image data components of the elements.

Image aspect corresponding reference 208, demonstrates computer and specific program operation to read the non-image data related to element 208, which is pointed out in it's randomized presentation prior to final image creation, and then after non-image data dictates which final image this element pertains to, and what aspect/position within that final image this element represents. Indeed, as demonstrated by elements 210 and 212 and their non-image data record as computer implemented, also occur in the same final image as element 208. This demonstrates the widely randomized elements due to the bulk containment following exposure; again, this containment is a box holding many elements, similar to the color particles occurring within a printer toner cartridge. An important difference is that a toner cartridge provides particles that a computer must indicate where to place, in the creation of a printed image, the toner itself having no such reference to any specific image. Herein, the elements in their particle form, in fact "know" where they belong within a series of final images, by way of the non image data recorded within the appropriate component, (under the emulsion side, which faces up,) which receives such data for storage while the elements are motionless in the exposure gate.

Options for maintaining maximum proper component in position, e.g., up and down, may be achieved potentially by magnetic means, for example, the non-image data side being affected to pull down toward the gate. A sufficient plurality of image information bearing elements may occur without such extra steps, with a proper quantity of elements being provided in a selectively effective dispersal within the gate.

The exposure gate can be of any selected size. By reducing enormously the weight, mass and surface area of raw material, for example, film stock, by eliminating at least the celluloid aspect and providing the unexposed emulsion in a powder-granulated-dust like form, the final image resolution result can be profound. For example, a gate can be larger than those known to 65 mm and all related to 70 mm motion picture systems. If configured in the Key Frame system configuration, wherein a single emulsion image is captured for every 24, for example, through the same visual providing camera lens, the emulsion elements or granules exposed and blown by compressed gas, for example, into a containment for the exposed granules may provide to all final images data thresholds equivalent to, for example, 20 k images and higher. See, for example, U.S. Pat. No. 5,687,011, and U.S. application Ser. No. 11/549,937, filed Oct. 16, 2006, each incorporated herein by reference in their entirety.

In one aspect, a hybrid emulsion and digital originating camera features discreet cartridges similar to large printer-toner plastic cartridges, that like the old super-8 cartridges for film, may be popped on and off following expose of the entirety of a cartridge of such emulsion elements or granules, and each of these potentially surprisingly compact and light cartridges may provide final images many fold more resolved than the heavy, large, cumbersome 1,000 feet of 35 mm film stock, and the single cartridge of the granules may further provide total recording time far in excess of 10 minutes per cartridge, improving on several aspects of emulsion imaging. By contrast, an emulsion originating camera requires a large celluloid emulsion magazine of film, allowing for only 10 minutes of capture time within the overall camera configuration. These elements, or granules, of recordable emulsion which contain a separate record of "where they belong" both in regard to which final image and exactly where within that final image their image data pertains, might be called "smart dust" emulsion, to simply imply their functionality.

Although in one aspect these elements are disclosed as a hybrid media scenario, for each element, in fact a further embodiment can involve only emulsion as both recordable media aspects. For example, image data is recorded on side, or part, of the elements. Recordable emulsion on the other side, or another part of the element might receive a visual or other appropriate stimulus encoding information, for visual recording and subsequent reading. Such a usable code for the image data positioning information, might be a micro bar code or other type of scannable-readable data encoding approach. The issue would be for each element, or granule of "smart dust" to be of a large enough size, however small, to provide sufficient non-image data recording media, e.g., emulsion, to inform the location of the corresponding image information bearing media, however small or large an amount of information that image information may be.

In an embodiment having an emulsion only recordable element, a third component, at the core of the granule or element that is potentially non-recordable, or possibly recordable, may provide a core for emulsion to coat, potentially as a ball or particle featuring only recordable emulsion on its entire three dimensional surface. One benefit of such an approach is that in providing such granules to the camera exposure gate for image capture, there is no question that recordable media is covering the gate area, at least entirely where each element granule occurs. Further the question of "which side is up" is no long an issue, the non-image data being potentially provided through a transparent gate floor where the granules rest during exposure to original visuals-light.

Like the moon which remains dark on one side while being exposed to the sun, where the moon is an example of an enlarged element granule, coated in emulsion with the interior being made of a structure and shape maintaining moon rock, the dark side of the moon might receive an emulsion recording stimulus also, to store a bar code or other information encoding image for subsequent reading resulting in a granule with an image of just a part of the sun recorded on one side and a bar code, for example, on the reverse. Following emulsion processing, the image information can be potentially digitized or otherwise prepared for image display. The information recorded on the dark side of the moon can provide reference to where within a specific final image of the entire sun that element's piece of the sun visual information will be provided in subsequent image data processing and final image creation.

Like VistaVision technology, film would be provided to the film gate horizontally, making the image size only limited "vertically" by the width of the film (gauge size,) such as 16 mm or 35 mm. In a further configuration, the film stock, (16 mm in this example though 35 mm is equally exemplary,) the film stock itself would not need sprockets; with the registration technology options today, and transport options, sprockets are cumbersome and wasteful of potential image storing media. The present invention, in the 35 mm configuration, would provide an image of a resolution and quality (original) that surpasses any digital originating information capturing means existing, providing the sole option today to capture a visual that only "tomorrow's" digital or other technology will have the ability to approach, during image capture.

Film can be selectively provided by a conventionally positioned film magazine, (of the normal or "disposable" configuration disclosed herein, involving reusable magazines loaded and unloaded by the manufacturer only.). Film could be provided by a horizontally positioned magazine; meaning 90 degrees perpendicular to the normal upright position of film magazines. This precludes additional film management and positioning needs, such as rollers turning the film 90 degrees to get it into the horizontal position for the film gate, and then back 90 degrees again after exposure to replace within a vertical film magazine. This positioning of film stock is useful in the present configuration as described for the present invention.

Herein, the providing of film stock to a film gate which is selectively similar, and selectively variable, in dimension to a rectangular cinema display screen, such as 1.66, or 1.85, (or for the present configuration the width herein will be 2 to 1. The advantage is that, in the case of 16 mm film, the visual can be selectively stored on an emulsion surface 16 mm "high", or closer to 14 mm if perforations are maintained on one side, and as wide as desired, in this instance, 33 mm or wider, for example. Though, the width would be entirely selective, potentially, by virtue of the virtually unlimited left/right media space per visual.

The present invention, in part, thus provides means for generating 35 mm, for example, wide visuals on 16 mm film stock, and visuals in very close dimension to cinema and HD screening dimensions, requiring little adjustment or distortion in the processes of providing final images to these screens. And, as said, 35 mm film stock would provide the means to originate material that surpasses the information capturing/storage means of any digital system, potentially for the foreseeable future. The emulsion surface area will approximately quadruple the visual information per image stored in the film stock. In fact, the use of 35 mm double-sided emulsion film stock and modified 35 mm film cameras, allow for an increase of emulsion area per visual of between 2 and 4 times, or more, than that typical to 35 mm film capture, depending on the amount of overall recording time the magazine of film is selectively reduced to, for example, from 10 minutes.

In one configuration, a single visual is recorded horizontally onto the film stock, which is selectively positioned parallel to the horizon line, relative to the film recording plane, and the lens capturing the visual. The recorded single visual would selectively occupy the space once allocated to, for example, three frames of 35 mm images. The dimension of such a recorded image is selectively very close to the horizontal dimension required for theatrical visuals, utilizing the increased emulsion made available, to a great degree and with minimal waste and "masking" needed to achieve the motion picture screen dimension, such as 1:85 to one, or even more rectangular in shape.

Herein, the use of the space of three typical film frames' emulsion area, would be compensated by the use of the opposite side of the film stock for recording as well, resulting in total recording time of a typical 1,000 foot roll of 35 mm film, 10 minutes approximately at 24 frames per second, to just under 7 minutes, though with a total emulsion surface area per image increased to approximately 4 times what is conventional on 35 mm, if not even greater recording surface area. Maintained as 10 minutes of material at 24 fps, the emulsion surface area over typical 35 mm vertical, single side of stock standard,) still vastly increased without affecting the standard recording time of a "roll" of film.

Again, as films today typically reach a "digital intermediate" stage, the fact that the film exposed is not created with "projection" in mind is logical and inherent to this invention. In fact, sprocket holes are not necessary, in a film transport means based on a selected advancement distance; digital post production means may provide perfect registration of final images, (and matching of images by code or other means,) from one "side" or strip of the film stock and the other. The sprocket hole and other film area may thus be employed selectively entirely in the recording of visual and other data, either entirely in the emulsion or within selected other means provided in the stock, including, but not limited to, magnetic recording material.

After exposure of the double sided film stock, it is likely that after processing of the film, prior or selectively after being "split" and separated into two strips, the lengths of larger horizontal filmed visuals will be digitized by an adapted "data-cine" or "telecine" apparatus capable of scanning the larger film frames; following digitization, these "negatives" on the thinner strips, relative to conventional 35 mm film, will be stored then for possible future "re-scan" when increased scanning and data storing means exist, beyond what today's technology can offer . . . . These larger filmed frames thus contain the additional image data for future application, relative to conventional 35 mm productions, or conventional digital cinema, e.g., digital origination, available today.

In a further aspect, the present invention provides selectively mirroring or related optics/image diversion means may relay the lens image to one film gate on one side of the film stock, for recording, and then the other gate, in a staggered delivery, prior to the film stock being advanced to the next horizontal frame of unexposed emulsion; in this configuration, the film stock would thus need only be advanced twelve frames per second, to achieve the 24 fps overall recording, both sides having been utilized. The image diversion means may selectively provide all, rotating mirroring or other means, or part of the lens image by beam splitting means, to each of the respective larger film gates. The lensing and hardware would be naturally adapted to accommodate the selectively width variable film gates which now are closer in size to the old "70 mm" film gates, in size, (which recorded visuals closer to 50 mm in actual recorded image width, depth of field and related photographic aspects selectively being affected by the change in "gauge size" or gate size, to the degree that optics and related hardware would need to accommodate same.

The present invention thus provides means to expose both sizes of film of a selected gauge size, with the use of 35 mm film, for example, providing filmed visuals of a resolution far superior to typical 35 mm filmed recordings. These film recorded visuals would selectively provide more information per visual than conventional digital systems can deliver today, thus providing filmed visuals potentially more compatible with digital (and other imaging systems) of the future, as the larger emulsion area holds a vast amount of visual information, surpassing image origination data typical to even the newest digital cinema options.

Should the 16 mm format be used to originate under the present invention, a final "print" from the "horizontally exposed" images to a conventional 35 mm film stock in the conventional direction and format, might be affected by printing means to alter the exposure level and/or color aspects as the visuals are "printed" onto another film stock, such as an "internegative" stock.

The goal being, to end up with a high quality negative of the "larger" gauge size, embodying aesthetic adjustments chosen in the digital domain and also benefiting from the unconventional use of the smaller gauge format, for example, 16 mm, to achieve visuals of, or nearing, those typically recorded by the larger gauge size, conventionally.

In total, the present invention provides means to originate with film using "smaller" lighter equipment while resulting in the comparable "original negative" surface area, and resolution and quality, to larger film gauge bases. Further, the present invention allows for origination with familiar 35 mm systems, including the lensing and housings familiar to the industry, while resulting in visuals with quality and resolution comparable to "70 mm" originated visuals, thus achieving the goal of surpassing the amount of visual information captured and stored during original photography of any digital system presently available, even if the initial use and screening means does not employ larger than existing digital technology, such as 2 k or 4 k, as the "existence" of an original "negative" that future technology can extract vastly more visual information from, for example, 20 k, renders that project "future ready" and in fact more in synch with the future of digital cinema and television than any existing digital origination means may provide.

With the enormous expense of making and releasing films, the availability of an original negative that may provide future applications in synch with the capture devices of the future, increases the potential for that project to be displayed more in the future, should systems upgrade to larger information management/display means, without significantly changing the capture, weight and expense aspects of originating on film.

Further, the staggered relaying of the lens image to one side of the film emulsion and then the other allows for the double sided film emulsion to be advanced once for it's entire length, without employing the other options of reversing the direction of the film, or employing a continuous "loop" and reversal-of-side or twist, means to allow the camera to expose one side of the stock entirely and then the other, entirely. However, the present invention does not preclude those or other options being employed in the horizontal exposure of the film stock, on both sides.

In another configuration of the present invention, conventional film stock of any gauge size, is exposed horizontally. The "magazine" of film storage means, often placed behind, or above the camera's mechanism and film gate, is selectively placed behind the camera, as is common in cameras by Arriflex and Aaton; this positioning is however not essential.

The film in this storage, e.g., magazine, would be horizontal not the typical vertical position, and thus parallel with the horizon, if the shot being captured were of a sunset/horizon for example. Thus, the film would enter the camera mechanism or film gate area as with Arriflex cameras, in the horizontal position. In the case of 16 mm film, the sprocket holes on single per stock, would selectively be occurring on top, or on the bottom of the stock, as it is presented to the camera film gate for exposure; without necessity, the present invention positions these sprocket holes on the bottom.

In the case of typical 35 mm stock, the sprockets occur on top and bottom; the present invention in one configuration involves film stock with only one side bearing sprocket holes, or in a further configuration, no sprocket holes as the digital domain eliminates the issue of registration, such subsequent picture matching occurring selectively in digital post production reducing concern over exacting position of film stock through the mechanism and film gate of film cameras.

The optics of film camera(s) would be modified to be similar to those of a larger gauge camera, as the present invention provides for exposure of emulsion areas typical to the "next step up" in gauge size: 16 mm cameras providing more like a 35 mm exposure emulsion area and 35 mm cameras of the present invention providing a remarkable gate and emulsion exposure area potentially surpassing that of typical 70 mm stock exposure by known 70 mm film cameras (and 65 mm, and others related to this large gauge size.)

The distance of optics to the film plane as well would be adjusted to allow for proper exposure of the larger provided emulsion surface area.

The width of the exposure area would be, selectively variable and, typical to high definition television display, thus the ratio of width to height would selectively be the same or similar to that of the eventual intended display systems/units. However, though an important configuration of the present invention is for this important dimension (such as with plasma TV monitors providing high-def content,) the width of the gate size could be variable in the present invention. Thus, the actual amount of film moved through the gate area would change selectively based on the display system, or setting, intended for the material, potentially. The film can be moved intermittently or continuously through the gate area. For example, if the material is destined for conventional TV display, a 1:33 to 1 ratio of film would be exposed so the potential of the present invention in the 16 mm camera configuration, would expose a negative image of approximately 14 mm×18.6 mm. If the intended display were high definition TV, the negative exposed and amount of film moved into the gate area would change to be approximately 14 mm×23 mm; and if the eventual display were a theatrical screen as wide as approximately 14 mm high×33 mm wide. These dimensions are important, as with the theatrical screen shooting intent, it is important to note that the present 16 mm configuration provides a significantly larger emulsion area for material that actually makes it to the screen, than today's typical 35 mm cameras, which for wide screen are often limited to capture emulsion dimensions for "live" material of approximately 14 mm high×21 mm wide.

In this configuration, the film gate is in the same position basically, as all film cameras used conventionally. In a supplemented version of this configuration, the film gate could occur horizontally, or otherwise, to allow for the second film gate of the other configurations of this invention, wherein both sides of the stock are exposed.

Though in both versions, the single and double gate versions, the selective variability of the exposed frame width is a one aspect of the present invention, changing literally the length of film advanced into the film gate based on the desired width of negative selected. In this way, film negative is never "cropped" and wasted as oft happens with 35 mm photography, wherein cropping vertically allows for the negative dimension to match the very rectangular shape of some film screens; the present invention allows thus for a superior image quality for such screens, on 16 mm for example, than 35 mm is capable of rendering via the currently configured camera systems.

The Film Stock and In-Camera Configurations

Embodiments of the invention that need not be in one particular configuration, include the double sided emulsion film stock and the double side exposing film camera:

The double film gate disclosure of the present invention and filings, may selectively not be perpendicular to the lens surface area, but positioned as typical film gates occur, though the two gates may be staggered (above and below, or at different points within the camera,) allowing for optics and selectively mirroring and/or other lens-image diversion means, to relay the lens image in it's totality, or a portion of it selectively if beam splitting is employed, to one gate and then the other.

In this configuration, reference information can be imprinted visually or by way of a data track or other recording means, to allow selectively the frames of film representing sequentially captured visuals, whether one exposed immediately after the other, or simultaneously, or later. Thus, film stock may undergo looping or other related in-camera management, via rollers and related components common to film cameras, in order to provide the reverse side of the same length of film stock for exposure. See U.S. Pat. No. 5,687,011, incorporated herein by reference in its entirety.

The length of double-sided film, e.g., emulsion occurring on both sides as it moves through the camera, may be exposed in a staggered frame-by-frame approach, e.g., an image on one side, then the other and then advancing the film to the next unexposed portion of stock, or the entire length of film may be exposed by way of a single gate system, whether parallel or perpendicular to the image capture lens, or otherwise positioned, with the reverse side of the same length being provided via film direction reversal means, or continuous loop and mechanical turning of the film stock to provide the second side after exposure of the first, or other such physical approaches for providing same.

Also, it is important to reiterate that the double sided film stock can be employed as a recording "time" enhancement, not quality related, allowing for the two sides of the film stock to be recorded as discussed above, with a conventional "gate" and exposure dimension to typical film cameras. The advantage therein being that recording time is exactly doubled, and conventional digitizing and film printing and processing machinery is set to deal with those particular exposure sizes, the vertical position of the images and the number of "perforations" per visual (or sprocket holes,) thus requiring only the issue of the potentially (selectively) thinner strips of film, if double sided film is "split" in to two strips prior to digitizing and/or processing and/or film printing, etc. An objective of the present invention is to provide film stock, (whether single or both sides emulsioned,) that is the same or similar weight and thickness to the stock that cameras typically manage today, though this is not essential or a limiting aspect.

Regarding the film stock of the present invention, in the single sided configurations of the horizontally provided film stock, one configuration would eliminate sprocket holes/perforations, allowing the film to the moved through the gate through the motion of the rollers (holding the stock and/or within the camera,) to allow the extra emulsion area lost with such sprocket holes to become media/image recording space. However, the present invention also works with the configuration of using typically available film wherein such sprocket holes occur. As both options may be provided in the future, the option of selectively adjusting the exposure area both with regards to width and height would be selectively provided in one configuration, to allow optimal use of emulsion area provided by a given stock's composition, for example, with or without perfs.

Therein, it is selective that film stock of the present invention that lacks sprocket holes may be transported roughly by the machinery of the camera, with subsequent perfecting of the "registration" of the pictures to each other occurring in the digital domain, or selectively markers occurring optically or on other data storage means, as an aspect of the film stock, may allow for laser or otherwise guided registration and film transport, such guidelines or markers also providing the means for a variable transport camera of the present invention, those moving a selectively adjustable length of film into a selectively wide gate area, to precisely quantify the transport of an amount of film per exposure.

Again, such cameras may operate ad variable speeds as with conventional cameras, however in the double sided configuration, wherein 24 fps is the anticipated final "digitizing" or display goal basis, even if altered in the video/digital real for digital display, the film need only be moved 12 time per second, in the configuration where the exposures are staggered (side 1, side 2, side 1, side 2 and so on), if the goal is to achieve a conventional 24 visuals per second of time.

The double sided, two sided emulsion coated film stock can be produced in a variety of configurations. In one non-limiting configuration, two lengths of "thinner" film stock are married to create a length of film stock that is a conventional weight and thickness for cameras, despite the emulsion occurring on two sides. Other configurations of doubled sided two sided emulsion coated film stock can be produced. Further, selectively, an opaque partition between the emulsions. on each respective side, such as a white celluloid, and/or plastic, or other reflective material, can provide that in the digitizing stage of the double sided emulsion, the film stock may be maintained, and created as, a single strip, as with conventional film stock: It would thus mean that in digitizing light would be reflected back from the film emulsion, based on the opaque later behind allowing for such reflectivity, to allow for digitizing as with reflective art, rather than as with light typically being projected through the film stock.

If digitizing in this way were of sufficient quality, relative to the projected approach, the need to "split" the film for separate digitizing, or printing or other use, of each separate strip would be avoided. The film could be digitized, both sides, one after the other, or simultaneously by a digitizing unit configured for that purpose, and maintained and stored as a single strip of selectively the same thickness and weight as conventional stock, with the only difference being that this double sided stock contains twice the image recording area means.

In the management of visuals shot in this "double sided" configuration, data referencing, e.g., visual or other magnetically or otherwise recorded data, on the film itself, each side, would selectively allow for all stock to be scanned, and even though the "second strip" might be digitized some time after the first, in the "split" stock two-sided configuration, the time-code or visual reference information (the "data") would allow for computing means to automatically assemble the visuals in digital form into their proper sequence, as they were captured. Thus, though not limited by this, the present invention is most geared to film capture of visuals destined to be, at some point, digitized and/or managed in the digital domain; even if eventually returned to film for display or other purposes.

Quality and Efficiency of Film Capture

Key filed frames can be exposed through the same lens as video/digital material, being used subsequently in the digital "recoloring" of that digitally originated material.

Aspects of the present invention are not limited by the term video, as digital visuals and digital visual data is indeed applicable, if digital origination was employed, e.g., for the "high definition" material. Further, high definition images stored on tape, does not preclude or is not limited in the present invention or that invention by how said digital (and/or video) images are stored, on tape, in a "drive", or on disc. The issue is the selectively simultaneous exposure of video and/or digital material and filmed visuals of the same or similar visuals (through the same lens, or lenses selectively positioned to capture similar material.

To provide new options affecting the quality and efficiency of film capture, herein is disclosed the selective further aspect of the system or method of exposing filmed visuals on any gauge size in conjunction with video and/or digitally originated images, and captured through the same lens or selectively by lenses separate but positioned for use by the present invention.

In one aspect, the film gauge is 16 mm film and the video media is digital high definition, e.g., digital data, and/or video data captured by CCD or other electronic capture means.

In the 35 mm configuration of the present invention, regardless of whether the film is exposed conventionally, horizontally, or on one side of film stock or on both sides of double-sided-emulsion on both sides-film stock, the opportunity is to capture, selectively, original visuals containing a vast amount of visual data surpassing today's standards, even surpassing old 70 mm film capture systems. Again, this is relevant for potential future digital or other visual means that may utilize the extra visual data of this large negative area, such as future systems able to manage "20 k" or higher.

A further aspect of the invention provides means to capture visuals on 16 mm that surpass 35 mm conventional image quality, and 35 mm images that surpass any digital capture for cinema means conventionally available.

Herein, the selective option of capturing fewer than 24 fps of film originated images is provided. Further, the "video tap" is in fact a high-definition video (and or digital) capture and storage means. This accomplishes the dual goal of enhanced preview on set during capture, by way of the digitally captured visuals, providing material at conventional digital rates such as 24 fps, or 29.97, or 30 or other known options employed for digital origination. Further, the digitally originated visuals, would contain cross reference image data related to the filmed visuals, e.g., selectively captured through the same lens, by way of beam splitting and/or image diversion means, such as mirrors and known optics, for later cross referencing between digitally originated (and stored) visuals and the film originated visuals. Magnetic striping or visual reference, or other data recording means on film, may be provided to allow for easy and selectively automatic cross referencing between the two types of originated visual material. In this configuration the film camera is primary, the digital unit relative equal or secondary with regards to "on line" capture material.

The further use of the approach is expanded, to acknowledge filmed visuals not used solely in "re-coloring" digitally originated material. The combination of highly resolved filmed visuals, exposed by the usual means and with the usual care, typically handled by a director of photography, with the secondary capture and storing of digitally captured material of the same scenes, and or visuals, selectively at the same or similar points in time.

The expanded purpose, herein, involves the desirable aesthetic and post production use of film originated material, potentially different from re-colored digitally originated material. Further, "morphing" and related image extrapolation e.g., inferring, technology may provide proprietary software to allow for the following:

Filmed material captured to be done so at a lesser frame rate than is conventional, such as 12 fps, or even fewer frames per second. Present technology employed as an aspect of the present invention, would thus allow for extrapolation of the "intermediary frames" not captured by film, to occur by way of digital approximation, based on inference of the digital data's position and shifting between available "film originated" frames, once digitized.

Further, exacting means to provide this "morphing" or creation of inferred visuals between available filmed ones, by way of the high definition digitally originated material. Therein, visuals indeed exist, highly resolved, to potentially aid in the creation of the inferred, and/or morphed visuals, which were not filmed, but are created from the filmed visual elements nonetheless. The positioning of aspects of the filmed visuals would be entirely referenceable within the digitally captured visuals, which doubled also as the visuals used for on-set preview, and initial editing.

Indeed, all editing of a project can begin and even be completed using the digitally originated materials, prior to receiving the filmed visuals, after processing, in digital form. In the "final edit," or creation of the digital master and/or related intermediates, the digitized filmed material would "replace" the digitally originated material, selectively as a final stage of post production, prior to selective additional adjustments of the visuals by a look manager system or related digital "look" refining means.

Visual code cross referencing data, carried through from the film negative to it's digitized version, relative to the high definition originated material, would selectively allow for immediate visual cross referencing exact to each frame.

Thus, several goals are accomplished:

16 mm film may provide conventional 16 mm and super 16 mm visuals, vertically exposed, either on one or both sides of film stock selectively, which may be exposed at a selectively slower frame rate, e.g., 12 fps, to allow for a longer record time from a single roll of film stock. Further, horizontally exposed visuals may provide emulsion areas per visual as large as approximately 14 mm×33 mm, surpassing typical 35 mm film origination quality, and selectively without changing, or even while increasing the overall record time a single roll of 16 mm provides.

Selectively few filmed frames may actually provide a sufficient amount of filmed image data to infer digitally, with or without use of the digitally originated material. Further, the disclosure of dual film gates, allowing for exposure of both sides of a two-sided-emulsioned film stock, with optics relaying the lens image first to one gate, and then the other, would selectively double the available visual data recording area provided therein. In total, the present invention would selectively allow for a final result, in digital form, or other visual form including film final, of filmed visuals surpassing 35 mm conventional filmed quality and/or resolution, while selectively maintaining all or even increasing the typical record time provided by a roll of 16 mm film, such as approximately 10 minutes. In one configuration, the record time would at least be doubled to 20 minutes per roll, while gaining the approximate 35 mm filmed quality emulsion area from a 16 mm stock; digital extrapolation means and/or double sided film stock aiding the effort.

A further benefit of the horizontal exposure variable film gate and film advancing quantity would be selectively employed, allowing for filmed visuals of any gauge size) to maintain the full vertical available recording area of a film stock, such as 35 mm if 35 mm sprocketless film were provided, while adjusting for the display ratio (1:33, 1:65, 1:66, 1:85, 2:35, all to 1) by providing a selectively larger (wider) amount of film stock for exposure per visual; thus affecting the length of each "advance" of the film stock, selectively intermittently or continuously, to provide the next portion of unexposed stock to the selectively varied film gate. Little or no waste occurs, or masking then, in providing a film stock ratio specific to a display ratio, all rectangular display systems, no matter how narrow or wide, being potentially serviced by visuals exposed based on the same screen ratio.

For 35 mm film stock, one configuration involves, as with 16 mm camera configuration, film stock that no longer involves perforations/sprocket holes. However, accounting for same presently and still claiming the improved image recording area of one configuration when that is available, the present invention and the above means described, would allow for film capture of visuals superior to the old 70 mm film originating, from 35 mm film, while not reducing, in fact selectively increasing, the total record time provided by a 1,000 or other size or length of 35 mm film. Thus, the filmed negative, of 24 fps or fewer, may be stored and referred to in the future when that negative may provide image data for higher information management systems, such as 20 k or higher, which present digital information would not be able to supply with visual data utilizing the capacity of such future, standard systems and options.

Further, digitally originated material may be employed in affecting the final digital material, it's look or other aspects, selectively; the digitally originated material may provide improved resolution or aspects to the filmed images, inherent to such electronic capture, selectively able to be contributed to digital visuals created from referring to both digitally originated and film originated material.

So, in a further system configuration, a firm(s) can provide the film stock for the system, whether conventional or adapted from what is typical, the digital "look management" and frame "inferring" or morphing software, the digital cross referencing between digital and film originated visuals, selectively exposed through the same lens selectively at the same or similar times, means to process and scan selectively horizontally exposed film frames of potentially different widths, among other necessary aspects of configurations of the present invention.

An incomparably efficient film camera would thus, in certain aspects, provide filmed material for the best present and future resolution options, with the ideal "video assist" in the form of high definition digital material captured through the same lens as the film. The end result being a minimally changed shooting scenario and equipment scenario on-set, an improved or at the least minimally affected shooting time per quantity of film stock, and an uncompromised or improved final "film originated and film look" digital result, selectively equal to or superior to such results from typical film systems of the next "larger" gauge size, (16 mm providing 35 mm quality, 35 mm providing 70 mm quality, etc.)

The present uses do not limit, though, the fact that high quality filmed and digitally originated material then exists relative to the same scenes and production; options beyond what have been stated exist and will exist relative to the existence of superior film negative and high definition digital material relative to the same shots or lens visuals.

Whether applied to conventional film stock and conventional vertical exposing and frame sizes, or adapted stock and exposure approaches, as described herein, embodiments of the present invention improves the visual quality and/or efficiency of film capture.

Horizontally Positioned Film Gates

In providing the camera lens image to the film stock, herein a horizontally positioned gate, or gates, has been disclosed in creating options to increase image capture quality options. In a further aspect, optics (and/or mirroring means) may "turn" the lens image 90 degrees before providing it to a vertically positioned film stock, as with today's conventional film cameras, wherein a fixed or variable film gate, where the width of the exposure area on the film stock is selectable, is not in the usual horizontal position relative to the lens and scene being captured, but offset 90 degrees.

Thus, film magazine(s) of cameras need not be repositioned and film stock need not be twisted or repositioned to achieve a horizontal film plane relative to the lens, as disclosed previously. Herein the lens image visual (light) is turned and/or bounced to be relayed at a 90 degree offset, as occurs with flatbed film editing tables, the film stock image being turned for display on the projection monitor. Again, the optics of a 16 mm system would be that of a 35 mm camera, or other option, including custom made option, to allow for the larger image area relay to the film stock. Again, the image area for exposure on the film stock would exceed that of the "next up" film gauge, as the film would be exposed horizontally on the stock, relative to it's length, to allow for the image height to be limited only by the gauge size, and the image width to be variable, limited only by the selected image ratio, based on selected final display system/option dimension or ratio. See drawing. In essence, the film gate is turned 90 degrees, is optionally of the variable type, as disclosed herein, and is provided with a lens image that has also been turned 90 degrees, to allow for proper exposure of the lens image in the ratio/dimension desired, though on film stock horizontally, as opposed to the typical film systems of today, wherein visuals are exposed vertically. The width of the visual is limited only by the gauge width of the film stock.

Hybrid Digital and Film Camera

Yet another embodiment related to the present invention is a hybrid digital and film camera, utilizing conventional 16 mm negative motion picture film stock. This in no way limits the application of the following with regards to gauge size, and it should be noted that sprocketless versions of any film gauge size, (or sprockets on only one side as with single perf stocks,) would allow for proper application of the present option(s):

Herein, the conventional film gate (vertical) associated with 16 mm motion picture cameras would be replaced by a modified "double sided gate," which would accommodate two strips of 16 mm stock, emulsion out, facing the lens image, allowing the sprocket holes of the stock to be on the "outside" of both strips, thus also on the left and right sides of the double gate.

Separate, linked film transport means, would allow selectively one side to move down, while the other side or strip of film would move up. Intermittently, unexposed portions of film stock would be "side by side," with only the very small strip, or line, between the separate stocks interfering with the capture of the lens image.

Selectively, the lens image delivered to the side-by-side strips of emulsion, would occupy 4 conventional 16 mm or super 16 mm frame areas. Thus, a single visual would be delivered to (selectively) approximately an area of emulsion, comprising the two separate strips, of more than conventional 3 perf 35 mm image recording means/area; in fact, the actual area provided selectively by the present invention is 15 mm high by 26 mm wide, two vertical frames/perfs per strip, side by side, providing an overall area of 364 square mm. This is an improvement over the emulsion provided by 35 mm 3 perf (1:85 to 1 image ratio) of over 5%, selectively.

Employing the "key frame" approach to utilizing filmed frames, whether captured as a single image or as a composite of separate captures, to improve resolution and/or aesthetics of digitally captured material, the present invention would allow 16 mm film cameras, with selected modifications, to capture the image data necessary to infuse digitally captured visuals with over 6 k of per-image data.

Proprietary software would allow for such image captures on two strips of emulsion, to be referenced by time code or other image coding referencing means, for application to the respective selected digitally originated visuals, captured selectively through the same lens at, or in and around the time said key frames were captures. This digitally originated material may be at a normal frame rate, such as 24 frames per second, selectively. The selectively flickerless and selectively high-definition digitally originated material, may selectively provide the image-zone (aspects') positioning data for proper allocation of the filmed key frame image data, in the creation of final visuals, (24 per second for example,) which embody in excess of 6 k per visual image data, as a result of application of key frame data to more than one digitally originated visual.

Herein, magnetic and/or visual coding means on the film stock, (selectively restricted to the film area to the thin side or edge of the perforated side of stock, or to other areas not restricting the emulsion area for image recording will provide cross referencing data for easy and/or automatic referencing between digitally originated visuals and filmed key frame visuals, for post production applications.

Thus, the film stock in one configuration is from a single roll of unexposed stock, as with conventional film cameras, the lens image is selectively diverted to allow for recording of the full lens image by a digital capture and recording means, with the same lens image providing the full lens image for selectively exposure as a variable, e.g., 1:33, 1:85, 2:35, ratio image on film stock selectively providing an emulsion area larger than conventional 35 mm capture, e.g., for cinema.

This film stock would undergo a repositioning, e.g., by rollers of other means, after initial exposure by the left side of the gate, allowing for the "flipped" stock to be returned for exposure by the other side of the gate, with the "emulsion area" still facing out, toward the lens image. Selectively, "double sided film stock" could allow for film to be returned to either side, both sides containing film emulsion, with a final result of a single roll of film stock having both sides full exposed, embodying latent images within emulsion on both sides of a single celluloid strip. In the simple configuration, conventional single sided 16 mm stock is described.

Selectively, each gate "side" would expose on, for example, two conventional "frame" areas, or emulsion related to two perforations of stock, and advance skipping the next two, as the other side can use that stock to expose the "other side" of the lens image, ongoing, continuously or intermittently. Time code reference for each and every perforation, or image portion, would make this jumble of visual parts easily sorted and allocated in post, automatically, selectively after a project has been edited from the digitally originated visuals, and final visuals are selected for affecting with the digitized filmed key frame visuals which are of improved resolution and/or aesthetic appearance.

In further aspects of the present invention, provides increase in visual quality, and also improvement in efficiency. As a single key frame per second, with appropriate post-production software, may be used to affect at least an entire "second" of digitally originated visuals, such as 24, a single roll of 16 mm film typically providing only approximately 10 minutes of recording time, may in fact provide now 60 minutes, selectively, while also providing a final film originated "look" result of 4× the normal resolution provided by typical super 16 mm systems. Selectively, more key frames per second may be exposed, and/or frames of different overall emulsion surface area, providing more or less recording time per roll of film. Should a roll provide 6 key frames per second, or one for every 4 digitally originated corresponding images, the recording time of a single roll of film still is not less than a conventional 16 mm camera and recording system, at 24 fps.

The present invention can provide the film stock to a conventional "take up" spool, changing the mechanics of the film camera as little as possible or selectively necessary; the stock having traveled through the double sided gate twice, being the key modification and mechanical modification. Further, in a modified film camera, two rolls or two separate strips of film may be delivered to the double gate, allowing separate rolls to literally be transported in the same direction through the double sided film gate. In this configuration, the advantage would be the amount of film stock overall, increasing recording time even further, the fact that smaller stock, for example, 16 mm as opposed to 35 mm, may provide images with higher resolution than conventional capture by 35 mm stock, and the further advantage is the elimination of the need for "twisting" the stock through various repositioning means to allow it to be exposed, and redelivered to the other side of the double sided film gate, for re-exposure, selectively in the same direction (up to down,) as before, or in the opposite direction (down to up,) before return of the exposed stock to the take-up reel.

Again, this system relates to a hybrid camera, selectively, wherein a digital image capture means captures through the same, or an adjacent, lens full conventional image captures at a selectively normal frame rate such as 24 fps, while the double-sided gate provides selectively very high quality filmed "reference" or key frames of the same or very similar lens image/visual.

It is very important to add, that the application of the horizontal aspects of film gate and film emulsion recording would provide an enormous gain in resolution, regardless of the film gauge size involved. Describing this improvement relative to 16 mm stock, a 1:85 ratio intended display dimension, and thus image capture dimension, and wherein one key frame, from two strips of the same length of celluloid/stock, is generated per second:

The emulsion area exposed, with the two strips positioned now as "top and bottom," instead of left and right, is increased to selectively 24 mm high×45 mm wide, each strip of 16 mm stock from selectively the same length traveling selectively in opposite directions providing 12 mm, or half, of the vertical recording/emulsion area of the full visual capture zone. This represents an overall final, digitized key frame containing over 18 k of data from 16 mm capture. Further, with one key per second being generated on film only, the overall recording area of a single 400 ft roll of conventional 16 mm film stock is still increased to 20 minutes over conventional 24 fps below "2 k" capture, doubling the overall film recording time while increasing image quality approximately 12 fold. This is indeed significant, as filmmaking logistics and methods are not compromised, equipment is not noticeably modified, in weight and selectively in configuration, and there is not only not a demand for more media in providing profound increases in visual quality, but a need for less, e.g., half in this example application.

Again, the horizontal gate configuration would place the strips of emulsion selectively in contact, or very close proximity to each other, one over the other. The selectively variable recording area of the horizontal gate area, would expose selectively images from 4 perforations wide (for TV ratio) to 6 wide, (for 1:85 cinema) and up to 8 perforations wide for providing images of 2:35 (wide screen) ratio, which is remarkably a final image data per visual result of approximately 23 k, from 16 mm stock with recording time still improved per roll, at nearly 16 minutes.

It is important to mention, a key aspect of the proprietary software of the present invention would be the digital means to "eliminate" the fold or "missing data" of the small gap occurring between the two strips of film. The digitally originated images would contain all the data necessary, (at 2 k resolution) for example, for seamless allocation of the "halves" of image data from the film stock, as a small line of "2 k" image resolution marrying halves of much higher resolution, would not be jarring or noticeable. Further, an aspect of the present inventions software would selectively involve extrapolating acceptable "transition" image data between the separate halves of film stock, e.g., captures, for seamless final visuals from the system of the present invention.

An improved aspect is that to expose the emulsion areas detailed herein, no moving optics or moving "gate" aspects need be employed, as both strips of emulsion are exposed simultaneously: Herein 16 mm double strip provides the resolution of single strip 35 mm horiz. 8 perf.

Increasing Quality and Recording Time of Digital Image Capture

A variety of configurations and options related to hybrid cameras are provided for imaging that allow for increased quality, recording time and other advantageous aspects for entertainment imaging, such as for cinema and television and other motion media.

In one aspect, one media captured selectively simultaneously with aspects of another media capture is used to affect the latter:

An all digital hybrid configuration is disclosed herein, for the purpose of extending the resolution, and amount of overall data per visual, possible to capture, for both still photography and motion media.

In a further aspect of the invention, a high definition digital camera captures selectively both a full visual capture of a lens image, and selectively through the same lens portions of the lens image in higher resolution, wherein said portions are captured for the purpose of affecting, or being affected by, said full visual capture, which was selectively of a lower initial resolution.

For example, one configuration of this invention involves a standard or "normal high definition" video (digital) capture of an image being delivered through a camera lens. This is selectively provided by "video tap" configuration, deriving the image capture from only a portion of the lens image, and selectively also this full visual may be captured through its own independent lens, as a part of a single camera with multiple lenses, or as a separate camera altogether configured to work in tandem with the unit capturing the "higher definition portions of the visual for later applications with/by the full visual capture.

In a further configuration, wherein all visuals are delivered through a single lens, the full visual capture is garnered from a selectively minimal portion of the lens image, requiring only a small portion of the "light" or overall visual information gathered by that lens, for proper rendition of the lens visual in the aspect ratio selected, (such as 1:66 to 1, or 1:85 to 1.)

This initial full visual capture may occur via familiar CCD or other "chip" or other single or multiple electronic capture means familiar with digital image capture, and recorded on tape, on a drive, or relayed for electronic transmission or any selected means for recording and/or relaying the digital data captured.

Time code associated or other visual labeling/tracking data means is provided and maintained/recorded relative to each visual of the full visual captures, for later use as an aspect of the present invention, and the objective of the present invention to end with modified digital visuals representative of the full visuals captured, though with overall resolution, and/or overall image data per visual, beyond what is conventionally possible.

A "subsequent" image capture means from the lens image, selectively the same lens that provided the full visual captures described above, involves a selectively high definition capture means, such as a 4 k digitizing chip(s) device(s,) or other means for capturing visuals of recognizably high photographic or cinema-graphic resolution. However, herein means for providing over a selective period of time, such as a second, only a portion of the lens image, not the full visual captured by the initial (or other image capture means of the present invention,) to the chip(s)/digitizing means. And, this means for providing a portion of the lens image further comprises means to subsequently provide a separate, selectively overlapping or not, portion of the lens image.

In a configuration of the present invention, the "chip(s)" or digitizing plane/means is not flat, but is cylindrical or of a circular or round shape, to allow it to moved, relative to the lens. Further, more than one "chip" or imaging plan/means may be involved in this "cylinder", or unconventional digital capture surface/means, allowing a second "capture" or another portion of the lens image to occur seamlessly and quickly after a previous image portion capture, so that in the course of a second of time, for example, one or more moving "chips" or image capture means, may be provided with new portions of the lens image to provide, for example, a 4 k capture means with a plurality of new lens image portions (of visual data) resulting in a series of visuals that in tandem, may, for example, represent a composite of image-portion captures of a single lens image that when "assembled" into a single visual, may represent a single visual with, for example, 20 k, 40 k or even 120 k of digital data, selectively per visual and/or selectively per second of digital video.

Selectively, the full visual capture, itself, for example, a 4 k, or even 2 k, or even lesser amount of data per visual, may in post production and by way of time-code reference, be used as a "template" for assemblage of the plurality of "4 k", for example, captures of portions of the full lens image. This template provided by a full visual capture, selectively captured at 24, 29.97 or other typical digital video capture rate of visuals per second, thus contains useful image position data for an entire second of digital motion visual data, for the plurality of very high resolution image-portion captures to be "applied to." Reciprocally, this process can be stated as the high definition image portions being assembled into a seamless mosaic with image aspects informed, position wise, by the full visual captures, thus the image portion captures are affected, rather than the full visual captures being affected. In essence, how this interdependence of visual data is "stated" does not change the aspect that they are used in tandem to create final digital visuals, either for still photography, a single visual, or for motion video, at 24 fps frame rate, for example, that are of a very high level of digital data overall, such as 12 k, 20 k, 120 k, employing morphing technology, selectively, and/or the full visual captures to "position" the image portion captures' position, and visual aspects therein, as those image portion captures precluded likely, in an among themselves, the proper capture of overall image-aspects positioning information that was captured, or potentially captured, by conventional full-visual captures, at 24 fps for example.

The lens image may be diverted in part to provide the full visuals' information for capture, prior to optical or other means for focusing, enlarging and/or delivering, selectively smaller portions of the overall lens image to the secondary recording means, such as the 4 k option mentioned above, and further with means to revise and/or move to deliver a new portion of the full lens image for subsequent capture.

Time code thus, in conjunction with "image zone" reference data, corresponding to the "zones" of the lens image a given capture represents, would result for example, in one second of image data, involving 24 digital visuals from the initial full visual captures, and selectively 24 "image portions" captured and referenced according to their image zone data, resulting in a "single" composite visual of, for example, 24×4 k, or 96 k; when this "single visual" of data, captured over the course of a second of time is applied to the 24 frames of full visual captures data, selectively employing morphing and/or other digital blending technology, and relying on the full visual captures to modify position of the very high definition visuals' aspects, such as selectively identifiable image zones representing objects and/or image portions distinguished according to selected criteria such as color variation or other means to distinguish image zones, the result is a seamless second of modified digital visual data representing 24 visuals, each 96 k, and all or most modified according to image-zones' position to allow the very high definition "composite" of image zones' data to selectively match the true image zone's position capture through the second of time, represented by the 24 frames of full visual data captured during the same second that the image portions were individually digitized. By making use of the highest information digitizing means, and means to reposition image data based on peripheral data, such as the corresponding full visual captures, a composite of available technologies combined with the new options herein, result in a significantly enhanced resolution capture means.

As with rotating drums in a photo-copying system, and other imaging systems, herein a selectively "moving" delivery of the lens image as opposed to a static delivery of a full lens image, to a selectively moving and/or selectively different capture means, such as 4 k CCD(s), a single lens may provide all of the visual information necessary to capture an extreme level of visual information related to a single lens image—digital repositioning and modification means, (as proprietary software of the present invention, may provide new all-digital video camera systems with resolution and/or overall data captured being a selective aspect, based on "how many" separate image zone captures and how much data the capture means may handle. For example, a 2 k image capture means wherein only three image zones are separately recorded each second, would result in a 6 k imaging system, using said full visuals capture option to affect said 2 k image portion captures, wherein only a maximum of 2 k image capture technology is needed.

By focusing the maximum image capture means/technology to selectively changing portions of a single lens image, it is possible to provide the image data necessary for compatibility with the image management and/or screening systems of "tomorrow." Meaning, if 96 k is the "projection" capacity of theatres in 10 years, today, in one aspect of the present invention, means exists to capture image data to allow for a final sequence of digital visuals, each containing and exploiting the 96 k data means, and resolution, that will make projects "tomorrow" for use; naturally if a "film" exists as 4 k, and the screening capacity in a few years is 96 k, if a film were even possibly "assembled' or revised to contain more than 4 k, such as 48 k, or 96 k, the use of that film or project and appeal of it technically will be enhanced in the future, increasing it's long-term value and possible application and viewing life.

An example application, may involve as simple a scenario as a static, flat chip(s) or other image digitizing means, positioned in line with the capture lens; or selectively a digitizing means with limited repositioning means, such as "tilting" left to right, a selective amount relative to the lens image. As the lens image is provided to the image digitizing means, such as chip(s),) an optic element, mirroring, prism means or other image diversion/delivery affecting means, provides selectively ⅓ of the lens image, left to right for example, then the next third, then the next. Then, selectively, the thirds may be provided relative to the next second of visual data, for example, the in reverse direction, right to left. The image portion selecting or diverting/delivery means, may be a rotating mirror or prism, for example, which is returned to the "first third" of the image, automatically, by virtue of it's repeating motion and position; such as a prism being back to it's original position, after it rotates 360 degrees.

Thus, a selectively fluid continuous motion, if both lens image diversion means and capture means move, capture of different, subsequent aspects of the same lens image, may occur. Or, if the image diversion means has an intermittent motion, stopping three times for example, as a new portion of image is delivered to a static image digitizer, such as a CCD for example, a 4 k digitizing means may provide 12 k of image data relating to the lens image, per second for example, (one complete visual composited, which may be used to affect 24 full frames of visual data, in essence "upgrading" the resolution of 24"2 k", or lesser resolution, visuals to 24"12 k" visuals, employing the single, composited/mosaic of 4 k image data representing distinct portions of the lens image, all occurring in lesser resolution within the full visual data of the conventional, e.g., "video assist" or primary capture stage of the invention, digital images captured.

Aspects of the invention include: How many distinct image portions of the lens image are digitized per second; How much they overlap with each other; How many conventional full visual digital images are captured per second; whether the lens, secondary optics and/or the digitizing means, chips or other means, move, are all selective options. The primary issue affecting the choice of these options is the eventual display system(s,) both in regard to resolution, aspect ratio and frame rate.

The objective is to create digital visuals of resolution exceeding the capture resolution of available "full visual" digitizing means. The software options making this feasible include means to affect visuals of the same, or similar, images, by way of time code, and other data options, cross referencing and in regard to image aspects that are identified to correlate: Lips moving over the course of a second, in a the continuous full visual images captured, 24 of them for example, may be enhanced in resolution in all 24 visuals thus, as though each portion of the visual has only a single high-high resolution reference, it is possible to extrapolate that the lips moving, as they "smile" maintain the additional digital data in the high-high resolution composite visual, or mosaic, only in slightly revised positions, informed by the actual position shifts of visual aspects recorded in the conventional full visual digital images.

Again, the mosaic of high-high definition data, creating for example a single frame of visual data per second, may upgrade all 24 frames of corresponding video captured, full visuals, during the second that "single frame" of high-high definition information was captured, resulting in the single reference, or "key frame" of visual data.

The selective capture of a key frame of visual data from a portion of the lens image diverted from another portion, used to capture more conventional digital data, such as 24 fps of 2 k digital visuals' data, is created at a selectively lesser capture rate, such as 1 overall total visual per second, for the express purpose of being used in affecting and modifying the more conventional digital material captured for a specific objective/reason, to "recolor" aspects/zones of the visuals to correspond to the "filmed color rendition" of those same image zone aspects; in the invention herein, to upgrade the more conventional full visual captures to a higher resolution, even a resolution higher than any full-visual capture means existing may allow, through digital application of the assembled key frame "mosaic" representing a single visual captured during the time a number of visuals were captured by the more conventional full visual means.

Again, digital image zone correlation and modification means, and even familiar morphing technology, make the present invention timely, feasible and logical; hybrid technology points the way to modified digital visuals, both in the simulation of preferred "looks", acting-as-if a selected film stock had been the original recording media overall, and in the simulation of enhanced resolution, acting-as-if a very high resolving digitizer had been used to capture the full visuals, even one surpassing by far those presently existing.

Quality and Resolution of Hybrid Film and Digital Cameras

In a further embodiment a hybrid film and digital cameras are provided wherein the media is configured in tandem for the purpose of capturing visuals with the visual quality of film and with a resolution amount of visual information surpassing conventional image capture utilized today:

A film camera capturing a visual through a single lens, which is "split", visually fragmented by a beam splitter of other lens-light diverting/dividing means, remains in the conventional film configuration of film stock and magazine containment. With regards to a 35 mm motion picture camera, such as PanaVision units, this means a magazine positioned on top of the camera, film which is delivered vertically to a gate for exposure and returned to the "take up" reel of the film magazine containment.

What is altered in the present configuration, related selectively to the optics and/or gate, or exposure area, of the film camera. Further, the digital or electronic picture capture aspect of the hybrid camera is high definition digital, with image quality similar to that of digital cinema units, such as the Sony CineAlta camera.

Herein, selectively variable aspects of the optics occurring selectively after the lens image has been in part diverted to the digital capture unit, or other flickerless "video assist" aspect allowing for electronic capture of the lens image, focus a portion of the lens image only to the film plane, for film emulsion recording continuously or intermittently within the film gate. Selectively the digital visual capture may occur through a separate lens, or other stage of the single lens capture process, in this configuration however a portion of the lens image is diverted for digitizing prior to the secondary aspect/process of the present system method's optics. However, conventional "video assist" options, such as the relaying of the lens image during the intermittent motion of the film, when the film plane is not receiving the lens image, may be employed selectively herein, allowing for conventional flick-free digital capture to couple with selectively conventional film capture process.

The difference herein, toward the objective of increased capture resolution, involves the delivery of a selectively different portion of the lens image to the film plane, to subsequent unexposed portions of emulsion (moved into the gate continuously or intermittently, as is conventional. As with a "zoom lens" where focal changes deliver a selectively different portion of the total possible lens image or scene to the film plane, herein at a selectively conventional 24 fps, or slower rate, even 2 fps, for example, selectively different portions of the overall lens image are delivered automatically to the film for recording, frame after frame. For example, in a simple configuration of the present invention, an image being originally captured at a given focal setting is delivered by lens optics toward the film plane for recording. Herein, selectively variable and/or moving optical elements, provide an amplification of what would have been the normal visual headed for the film plane, providing selectively half of the full lens image to the 35 mm film plane, and then after continuous or intermittent transport of the film to the next portion of unexposed motion picture film, selectively the other half of the lens image is provided to the gate and film plane for recording.

In this system and method, instead of a single lens visual being recorded at one instant onto a selected piece of emulsion, the lens image is delivered in stages two in this example to separate pieces of emulsion, allow for distinctly different recorded visuals to occur within two sequential frames of film emulsion, overlapping in visual content. Herein, digital means or other means, may be employed in post production to create a single visual, representative of the full lens image (delivered to these variable optic aspects, or other electronic image delivery and varying means,) from the sequential film frames.

What is gained, herein, is visual quality. When a widescreen cinematic visual is initially recorded by a 35 mm camera, for example, the emulsion available for the visual is limited by the width of the film stock. Typically, in a camera not anamorphically altering the scene captured, the wide visual occupies less film emulsion, than even a typical filmed television show capture means; this is because the ratio of the display means for a television show is more "square" allowing for more of the "4 perf" emulsion area to be utilized in capturing a single visual. Thus, ironically, significantly less emulsion is used per original scene/image area, when capturing a visual for a large screen display means, such as a 1:85 to 1 cinema screen, than is used when capturing a visual for a small screen (1:33 to 1) television display intent.

The entire emulsion surface area found within 4 perforations (vertically) of 35 mm film, may be utilized in recording a selected portion of the lens visual that would have been delivered in it's entirety to a single frame of film. So, in one example, the variable optics may provide 12 or less representation of the "left side" of the lens image that would have been recorded on a single frame of film, and 12 or less representative of the "right side" of said lens image. Thus, in this example, a visual of as wide or wider than the cinema screen ration 2:35 to 1, may be captured within two subsequent frames of 35 mm motion picture film, providing a final visual, if the "sides" are married in digital post production, for such wide screen display means stored initially within an overall emulsion surface area many fold that which would have been utilized in capturing such a lens image, conventionally. This affects image quality.

Further, not being limited to horizontal, or left to right, partitions of lens images, sophisticated variable optic means may provide, for example, 12 separate portions of a lens image, or less, or more, with portions of the lens image coming from different areas both horizontally and vertically within the original lens image. Such a capture system then provides, from a single second of recording for example, 24 frames of high definition, or regular definition, digital visuals captured by the electronic capture aspect of the hybrid camera, such as the well known "video assist" aspect, and 24 frames of 35 mm picture film, wherein selectively the configuration capturing two frames of 4 perf visuals for each overall framed scene visual, resulted in a visual quality, e.g., emulsion, more like 70 mm film capture. In a scenario where in 12 frames of film, if running at 12 fps, wherein a selectively unique portion of the lens image is delivered to each frame, an imaging result may exceed any currently known approach to capturing images for entertainment.

In that scenario, the mosaic of captures from portions of the overall image, provides a final emulsion surface area, per visual, that is enormous; in essence, as large as all 12 frames' recording area pasted together, more like still photography's 2¼" negatives.

In post production, by way of existing morphing technology and selective digital replacement means, the digital images or video captured may selectively provide all of the image elements' positioning data necessary to apply the filmed image, once assembled as one, digitally for example, per second, to the 24 frame of originated digital material. As a result, for future display, and current very high resolution display means, the large "key frames" of data, created by different subsequent frames of film that in tandem represent a single "scene" being photographed, provide all of the original visual data necessary for display systems of the future, that may exceed even 30 k, for example.

In one aspect of the invention is disclosed a relatively unchanged camera configuration, with optics including means to isolate distinct portions of a scene, through a lens, for subsequent recording on a film stock. When digital assembled, and selectively utilizing conventional digital visuals originated of the full scene framed, the image "portions" recorded on film provide an increased emulsion recording size of a selected amount, for selective digitizing and assemblage, in association with the digitally originated material, or not.

In a further aspect, 24 frames of digital material captured, may be selectively applied to the extremely high resolution overall visual resulting from (even 24) distinct 35 mm frames representative of a single "scene" framed by the cinematographer. Therein, though somewhat absurd at the present, perhaps less so in the future, morphing and image aspect repositioning means may provide post production software to allow those 24 distinct captures from a single scene to result in 24 frames of the full scene, provide by the full frame original digital captures, with the potentially more than 6 k of data per film frame resulting in 24 overall frames of motion media, each and every of those 24 frames containing potentially over 140 k of data.

Though the uses for 140 k images may be limited today, the availability of the ability to extract such image quality from entertainment projects shot today may affect such projects' compatibility and use in the future—wherein projects limited to 4 k, for example, may be less desirable for systems and audiences geared to much higher quality future systems of viewing.

Again, in the simplest configuration, a single 2:35 to 1 ratio visual, for example, may be captured within 24 frames of 35 mm emulsion as 12 "left side" portions of the framed scene, and 12 "right side" portions, (recorded in staggered order, left, right, left, right, selectively.

24 frames of video material captured in tandem with said filmed images, even "video assist material", may be referenced or employed in allocating the "sides" of filmed visual data, once digitized for example, to assemble 24 final digital images with selectively an image quality exceeding 12 k, and likely approaching 20 k, considering the efficient use of the 4 perf emulsion area.

In essence, the 35 mm cameras of today may provide approximately 70 mm originated cinema images, meaning images similar to those captured with 65 mm or 70 mm "equipment" and film stock.

16 mm cameras, for example, with the hybrid configuration, purpose and means herein, may provide final visuals well in excess of conventional 35 mm cameras today. And, in any gauge size, while selectively extending the recording time of the film media. For example, if a lens image or scene is captured on film as 6 distinct areas, or portions, totaling the full scene, that is 6 fps. So, the net effect is while increasing image quality by at least 6 times, over conventional 16 mm capture, the recording time of a single roll of film is quadrupled, as film is running at ¼ the normal frame rate; as film is capturing reference frames, while the digital aspect of the hybrid unit is capturing full frame visual data, including image data relating to the shifting or changing or repositioning of elements recorded during a single second, that may have been "missed" by the filmed frames.

Thus, digital technology allows for the higher resolution of the single assembled film frame, to not be compromised in repositioning those higher resolution "elements" relative to their counterparts within the digitally originated visuals. Thus, nothing is compromised in resulting in digital images, with the "look" of film, with virtually unlimited resolution and wherein film recording time is simultaneously extended dramatically.

Although the foregoing invention has been described in some detail by way of illustration and example for purposes of clarity of understanding, it will be readily apparent to one of ordinary skill in the art in light of the teachings of this invention that certain changes and modifications may be made thereto without departing from the spirit or scope of the appended claims.

What is claimed:

1. A method, comprising: receiving first video image data of a scene, the first video image data derived from a first plurality of images representing first portions of the scene, each of the first plurality of images having been captured on a first medium, wherein the first video image data are respectively associated with a sequence in which the first plurality of images were captured;

receiving second video image data of the scene, the second image data derived from a second plurality of images representing second portions of the scene, the second plurality of images having been captured on a second medium that is different from the first medium, wherein one of the first and second media includes digital content, with each image of the second plurality of images corresponding with at least a sequence in which each of the second plurality of images was captured, wherein the first plurality of images and the second plurality of images are captured via one lens of the same camera; and generating third image data of the scene, the third image data comprising at least one composite image from at least the first video image data and the second video image data and generated at least in part by associating information relating to the first and second portions of the scene in relation to positional variations of aspects represented within the second portions of the scene, wherein the at least one composite image has a resolution that is greater than the resolution of any one of the first plurality of images and the second plurality of images.

2. The method of claim 1, wherein the first video image data corresponds to a key frame and the second video image data corresponds to a wire frame.

3. The method of claim 1, wherein the generating the third image data further comprises:
identifying an object represented by the first video image data;
determining a position of the object as represented in the second video image data; and wherein the third image data represents the object according to the position of the object as represented in the second video image data.

4. The method of claim 1, wherein a resolution of the third image data is configurable.

5. The method of claim 1, wherein a second capture rate is twenty four frames per second and a first capture rate is three frames per second.

6. The method of claim 1, wherein time data is representative of capture times of the one or more first resolution images respectively within a period of time.

7. The method of claim 1, wherein the first video image data includes a triptych image.

8. The method of claim 1, wherein the second video image data comprises positional information for objects depicted in the first plurality of images.

9. The method of claim 1, further comprising, generating a video of the scene comprising the third image data.

10. The method of claim 1, wherein a number of second resolution images is a multiple of a number of first resolution images and the number of first resolution images is greater than one.

11. The method of claim 10, wherein the third resolution images are equal in number to the second resolution images.

12. The method of claim 1, wherein one or more first plurality images recorded on film stock.

13. The method of claim 1, wherein the second portions of the scene include more of the scene than the first portions of the scene.

14. The method of claim 1, wherein the camera is configured to capture the aspects in response to a user instruction.

15. The method of claim 1, wherein the camera includes at least one lens, and the camera is configured to alter a projected pathway of at least a portion of a lens image relative to an electronic image capture device.

16. The method of claim 15, wherein the electronic image capture device is a charge-coupled device.

17. The method of claim 1, wherein the resolution of the third image data is at least twice the resolution of any resolution of the first plurality of images and the second plurality of images.

18. The method of claim 1, further comprising identifying and eliminating information from the third image data that represents redundancy from the first and second plurality of images.

19. The method of claim 1, wherein the first medium includes photographic emulsion.

20. The method of claim 1, wherein the second medium includes an electronic capture device.

21. The method of claim 1, wherein the first medium includes an electronic capture device.

22. The method of claim 1, wherein the second plurality of images are captured at a different capture rate than the first plurality of images.

23. The method of claim 1, wherein each of the second portions includes aspects of at least two of the first portions.

24. The method of claim 1, wherein each of the second portions includes aspects of all of the first portions.

25. The method of claim 1, wherein the third image data is generated in relation to at least a correlation of data relating to the sequence in which the first plurality of images were captured relative to the information representing at least the sequence in which each of the second plurality of images were captured.

26. The method of claim 1, wherein the second video image data relate to spatial information of aspects of the scene featured visually within corresponding aspects within the first video image data.

27. A device, comprising:
means for receiving first video image data of a scene, the first image video data derived from a first plurality of images representing first portions of the scene, each of the first plurality of images having been captured on a first medium, wherein the video image data are respectively associated with a sequence in which the first plurality of images were captured;
means for receiving second video image data of the scene, the second image data derived from a second plurality of images representing second portions of the scene, the second plurality of images having been captured on a second medium that is different from the first medium, wherein one of the first and second media includes digital content, with each image of the second plurality of images corresponding with at least a sequence in which each of the second plurality of images was captured, wherein the first plurality of images and the second plurality of images are captured via one lens of the same camera; and
means for generating third image data of the scene, the third image data comprising at least one composite image from at least the first video image data and the second video image data and generated at least in part by associating information relating to the first and second portions of the scene in relation to positional variations of aspects represented within the second portions of the scene, wherein at least one composite image has a resolution that is greater than the resolution of any one of the first plurality of images and the second plurality of images.

28. The device of claim 27, further comprising:
means for splitting light indicative of the first video image data and the second video image data.

29. The device of claim 28, wherein the means for receiving the first video image data rate and the means for receiving the second video image data rate respectively receive the light indicative of the first video image data and the second video image data from the means for splitting the light indicative of the first video image data and the second video image data.

30. The device of claim 27, wherein the means for receiving the first video image data further comprises:

means for relaying portions of the first video image data or the second video data to respective charge coupled device arrays.

31. The device of claim 27, wherein a time code data is representative of capture times of the one or more first resolution images respectively within the period of time.

32. A system, comprising:
an image capture device configured to capture a first plurality of images representing first portions of a scene, each of the first plurality of images having been captured on a first medium, wherein the image capture device or a second image capture device is configured to capture a second plurality of images representing second portions of the scene, the second plurality of images having been captured on a second medium that is different from the first medium, wherein one of the first and second media includes digital content, and further wherein the first plurality of images and the second plurality of images are captured via one lens of the same camera; and
an image processor configured to:
receive first video image data derived from the first plurality of images, wherein the first video image data are respectively associated with a sequence in which the first plurality of images were captured;
receive second video image data derived from the second plurality of images; and
generate third image data of the scene, the third image data comprising at least one composite image from at least the first video image data and the second video image data and generated at least in part by associating information relating to the first and second portions of the scene in relation to positional variations of aspects represented within the second portions of the scene, wherein the at least one composite image has a resolution that is greater than the resolution of any one of the first plurality of images and the second plurality of images.

33. The system of claim 32, wherein the positional information is wire frame information.

34. The system of claim 32, wherein the image capture device further comprises:
a beam splitter coupled to the lens, the beam splitter configured to direct light to the image capture device and the second image capture device, wherein the first plurality of images is captured via the image capture device or the second plurality of images are captured via the second image capture device.

35. The system of claim 34, wherein the image capture device is a film camera.

36. The system of claim 34, wherein the second image capture device is an electronic imaging module.

37. The system of claim 36, wherein the electronic imaging module is an array of charge coupled devices.

38. A non-transitory computer-readable storage medium comprising computer-readable instructions that, in response to execution, cause a computing system to perform operations, comprising:
receiving first video image data of a scene, the first video image data derived from a first plurality of images representing first portions of the scene, each of the first plurality of images having been captured on a first medium, wherein the first video image data are respectively associated with sequence in which the first plurality of images were captured;
receiving second video image data of the scene, the second image data derived from a second plurality of images representing second portions of the scene, the second plurality of images having been captured on a second medium that is different from the first medium, wherein one of the first and second media includes digital content, with each image of the second plurality of images corresponding with at least a sequence in which each of the second plurality of images was captured, wherein the first plurality of images and the second plurality of images are captured via one lens of the same camera; and
generating third image data of the scene, the third image data comprising at least one composite image from at least the first video image data and the second video image data and generated at least in part by associating information relating to the first and second portions of the scene in relation to positional variations of aspects represented within the second portions of the scene, wherein the at least one composite image has a resolution that is greater than the resolution of any one of the first plurality of images and the second plurality of images.

39. The non-transitory computer-readable storage medium of claim 38, wherein the first video image data includes a first image corresponding to a first frame and a second image corresponding to a second frame.

40. The non-transitory computer-readable storage medium of claim 38, wherein the first video image data comprises a key frame and the second video image data comprises a wire frame.

* * * * *